United States Patent
Honda et al.

(10) Patent No.: US 9,754,386 B2
(45) Date of Patent: Sep. 5, 2017

(54) INFORMATION PROCESSING SYSTEM, INFORMATION PROCESSING APPARATUS, INFORMATION TERMINAL APPARATUS, INFORMATION PROCESSING METHOD, AND INFORMATION PROCESSING PROGRAM

(75) Inventors: Shinichi Honda, Saitama (JP); Yoshikatsu Kanemaru, Tokyo (JP); Norio Nagatsuka, Saitama (JP); Shinichi Kariya, Chiba (JP); Kouichi Matsuda, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 415 days.

(21) Appl. No.: 14/408,027

(22) PCT Filed: Jun. 28, 2012

(86) PCT No.: PCT/JP2012/066617
§ 371 (c)(1),
(2), (4) Date: Dec. 15, 2014

(87) PCT Pub. No.: WO2014/002239
PCT Pub. Date: Jan. 3, 2014

(65) Prior Publication Data
US 2015/0178952 A1    Jun. 25, 2015

(51) Int. Cl.
*G09G 5/00*   (2006.01)
*G06T 11/00*   (2006.01)
(Continued)

(52) U.S. Cl.
CPC .............. *G06T 11/00* (2013.01); *A63F 13/12* (2013.01); *A63F 2300/308* (2013.01);
(Continued)

(58) Field of Classification Search
CPC ... G06T 11/00; G06T 2215/16; G06T 19/006; G06T 7/20; G06T 7/215; G06T 19/00;
(Continued)

(56) References Cited

U.S. PATENT DOCUMENTS 7,140,962 B2   11/2006   Matsuyama
8,012,020 B2    9/2011   Yamada
(Continued)

FOREIGN PATENT DOCUMENTS

CN    1520913 A    8/2004
CN    1671444 A    9/2005
(Continued)

OTHER PUBLICATIONS

Office Action for corresponding CN Application No. 201280074112.0, 23 pages, dated Jul. 1, 2016.
(Continued)

*Primary Examiner* — Robert Craddock
(74) *Attorney, Agent, or Firm* — Matthew B. Dernier, Esq.

(57) ABSTRACT

An information processing system in which an object corresponding to each of two or more users are arranged in a virtual space and moving image information indicative of a moving image indicative of a manner in which the virtual space is viewed from a predetermined viewpoint arranged in the virtual space is generated, this information processing system comprising activity information acquisition means for sequentially acquiring activity information indicative of an action of at least one of the two or more users, arrangement region determination means for determining a partial region in the virtual space, in the partial region of which the object is arranged in accordance with the acquired activity information, motion data acquisition means for acquiring motion data stored as related with the activity information in
(Continued)

accordance with the acquired activity information, and object control means for making the object act in the partial region in accordance with the acquired motion data.

10 Claims, 16 Drawing Sheets

(51) Int. Cl.
   *A63F 13/30* (2014.01)
   *G06T 19/00* (2011.01)
   *G06T 7/20* (2017.01)
   *G06T 7/215* (2017.01)

(52) U.S. Cl.
   CPC . *A63F 2300/535* (2013.01); *A63F 2300/5546* (2013.01); *G06T 7/20* (2013.01); *G06T 7/215* (2017.01); *G06T 19/00* (2013.01); *G06T 19/006* (2013.01); *G06T 2215/16* (2013.01)

(58) Field of Classification Search
   CPC ............... A63F 13/12; A63F 2300/308; A63F 2300/535
   USPC .................................................. 345/632, 622
   See application file for complete search history.

(56) References Cited

U.S. PATENT DOCUMENTS

| | | |
|---|---|---|
| 2004/0009798 A1 | 1/2004 | Matsuyama |
| 2005/0195184 A1 | 9/2005 | Yoshiike |
| 2005/0248091 A1 | 11/2005 | Neervoort |
| 2009/0011831 A1 | 1/2009 | Yamada |
| 2009/0318224 A1* | 12/2009 | Ealey ............... A63F 13/005 463/31 |
| 2011/0106912 A1 | 5/2011 | Onda |

FOREIGN PATENT DOCUMENTS

| | | |
|---|---|---|
| CN | 1798593 A | 7/2006 |
| CN | 101146580 A | 3/2008 |
| CN | 101573734 A | 11/2009 |
| CN | 102016857 A | 4/2011 |
| CN | 102036723 A | 4/2011 |
| EP | 1391847 A1 | 2/2004 |
| JP | 2011050724 A | 3/2011 |
| JP | 2011083508 A | 4/2011 |

OTHER PUBLICATIONS

International Preliminary Report on Patentability and Written Opinion for corresponding PCT Application No. JP2012/066617, dated Jan. 8, 2015.

International Search Report for corresponding PCT Application No. JP2012/066617, dated Jul. 24, 2012.

* cited by examiner

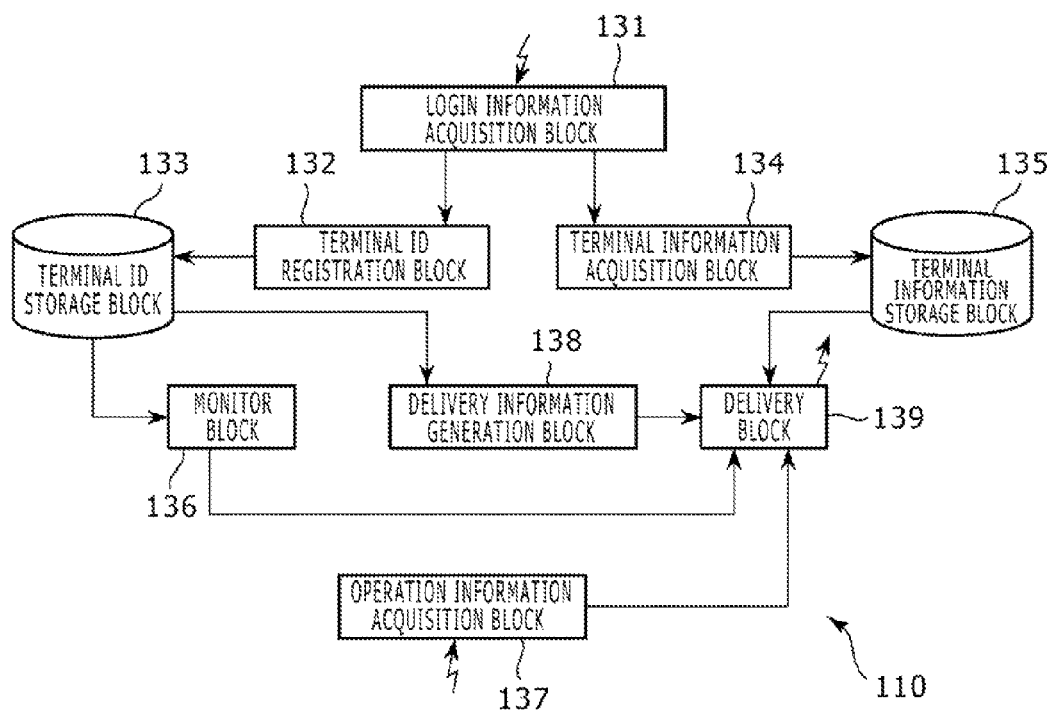

FIG.12

| CATEGORY ID | TYPE ID | CONTENT ID | ACTIVITY ID | PARTIAL REGION ID |
|---|---|---|---|---|
| C1 | Si | G1 | a1 | r1 |
| C1 | Si | G1 | a2 | r2 |
| C1 | Si | G1 | a3 | r3 |
| C1 | Ad | G2 | a1 | r1 |
| ~ | | | | |
| C2 | Pops | M1 | a1 | r4 |
| C2 | Pops | M1 | a2 | r5 |
| C2 | Pops | M1 | a3 | r6 |
| C2 | Rock | M2 | a2 | r7 |

INFORMATION PROCESSING SYSTEM, INFORMATION PROCESSING APPARATUS, INFORMATION TERMINAL APPARATUS, INFORMATION PROCESSING METHOD, AND INFORMATION PROCESSING PROGRAM

TECHNICAL FIELD

The present invention relates to an information processing system, an information processing apparatus, an information terminal apparatus, an information processing method, and an information processing program.

BACKGROUND ART

A so-called community service is known in which users arrange characters in a virtual space each of which operated by a different user in order to communicate with each other. For example, in such a virtual space, a position and posture of a character corresponding to a particular user change in accordance with an operation by the user through operation means of a user's terminal and communication with other users is executed through a chat function or the like.

SUMMARY

Technical Problem

However, in a general community server like one mentioned above, because each user freely move within a virtual space in accordance with an operation executed by each user, another user may not easily visually know a such life activity of another user as that the user is moving or working for example.

In consideration of the problems mentioned above, it is one object of the present invention to provide an information processing apparatus and so on that realize community services providing values high for users.

Solution to Problem (1) An information processing system of the present invention arranges an object corresponding to each of a plurality of users in a virtual space and generates moving image information indicative of a moving image indicative of a manner in which the virtual space is viewed from a predetermined viewpoint arranged in the virtual space. This information processing system includes activity information acquisition means for sequentially acquiring activity information indicative of an action of at least one of the plurality of users; arrangement region determination means for determining a partial region in the virtual space, in the partial region of which the object is arranged in accordance with the acquired activity information; motion data acquisition means for acquiring motion data stored as related with the activity information in accordance with the acquired activity information; and object control means for making the object act in the partial region in accordance with the acquired motion data.

(2) An information processing program of the present invention arranges an object corresponding to each of a plurality of users in a virtual space and generates moving image information indicative of a moving image indicative of a manner in which the virtual space is viewed from a predetermined viewpoint in the virtual space. This program causes a computer to function as activity information acquisition means for acquiring activity information indicative of an action of at least one of the plurality of users; arrangement region determination means for determining a partial region in the virtual space, in the partial region of which the object is arranged in accordance with the acquired activity information; motion data acquisition means for acquiring motion data stored as related with the activity information in accordance with the acquired activity information; and object control means for making the object act in the partial region in accordance with the acquired motion data.

(3) An information processing method of the present invention arranges an object corresponding to each of a plurality of users in a virtual space and generates moving image information indicative of a moving image indicative of a manner in which the virtual space is viewed from a predetermined viewpoint arranged in the virtual space. This information processing method includes the steps of sequentially acquiring activity information indicative of an action of at least one of the plurality of users; determining a partial region in the virtual space, in the partial region of which the object is arranged in accordance with the acquired activity information; acquiring motion data stored as related with the activity information in accordance with the acquired activity information; and making the object act in the partial region in accordance with the acquired motion data. (4) An information terminal apparatus of the present invention arranges an object corresponding to each of a plurality of users in a virtual space and acquires moving image information indicative of a manner in which the virtual space is viewed from a predetermined viewpoint arranged in the virtual space. This information terminal apparatus includes content identification information acquisition means for acquiring content identification information for identifying content; activity identification information acquisition means for acquiring activity identification information for identifying an action of a user; user identification information acquisition means for identifying a user; activity information transmission means for sequentially transmitting activity information including the user identification information, the content identification information, and the user identification information to an information processing apparatus; moving image information acquisition means for acquiring the moving image information; and display means for displaying the acquired moving image, wherein the moving image information is moving image information that made the object act with motion data acquired in accordance with the activity identification information, in a partial region in the virtual space corresponding to the content identification information.

(4) An information terminal apparatus of the present invention arranges an object corresponding to each of a plurality of users in a virtual space and acquires moving image information indicative of a manner in which the virtual space is viewed from a predetermined viewpoint arranged in the virtual space. This information terminal apparatus includes content identification information acquisition means for acquiring content identification information for identifying content; activity identification information acquisition means for acquiring activity identification information for identifying an action of a user; user identification information acquisition means for identifying a user; activity information transmission means for sequentially transmitting activity information including the user identification information, the content identification information, and the user identification information to an information processing apparatus; moving image information acquisition means for acquiring the moving image information; and display means for displaying the acquired moving image, wherein the moving image information is moving image information that made the object act with motion data acquired in accordance with the activity identification information, in a partial region in the virtual space corresponding to the content identification information.

BRIEF DESCRIPTION OF DRAWINGS

FIG. 2 is a diagram for describing a functional configuration of an information processing apparatus in the first embodiment.

FIG. 3 is a diagram for illustrating one example of terminal IDs and user IDs stored in the first embodiment.

FIG. 12 is a diagram for describing one example of arrangement information stored in an arrangement information storage block in the second embodiment.

DESCRIPTION OF EMBODIMENTS

The following describes embodiments of the present invention with reference to accompanying drawings. It should be noted that, with these drawings, the similar or equivalent elements are indicated with common signs and the duplicate description will be skipped.

The First Embodiment

Figure 1:
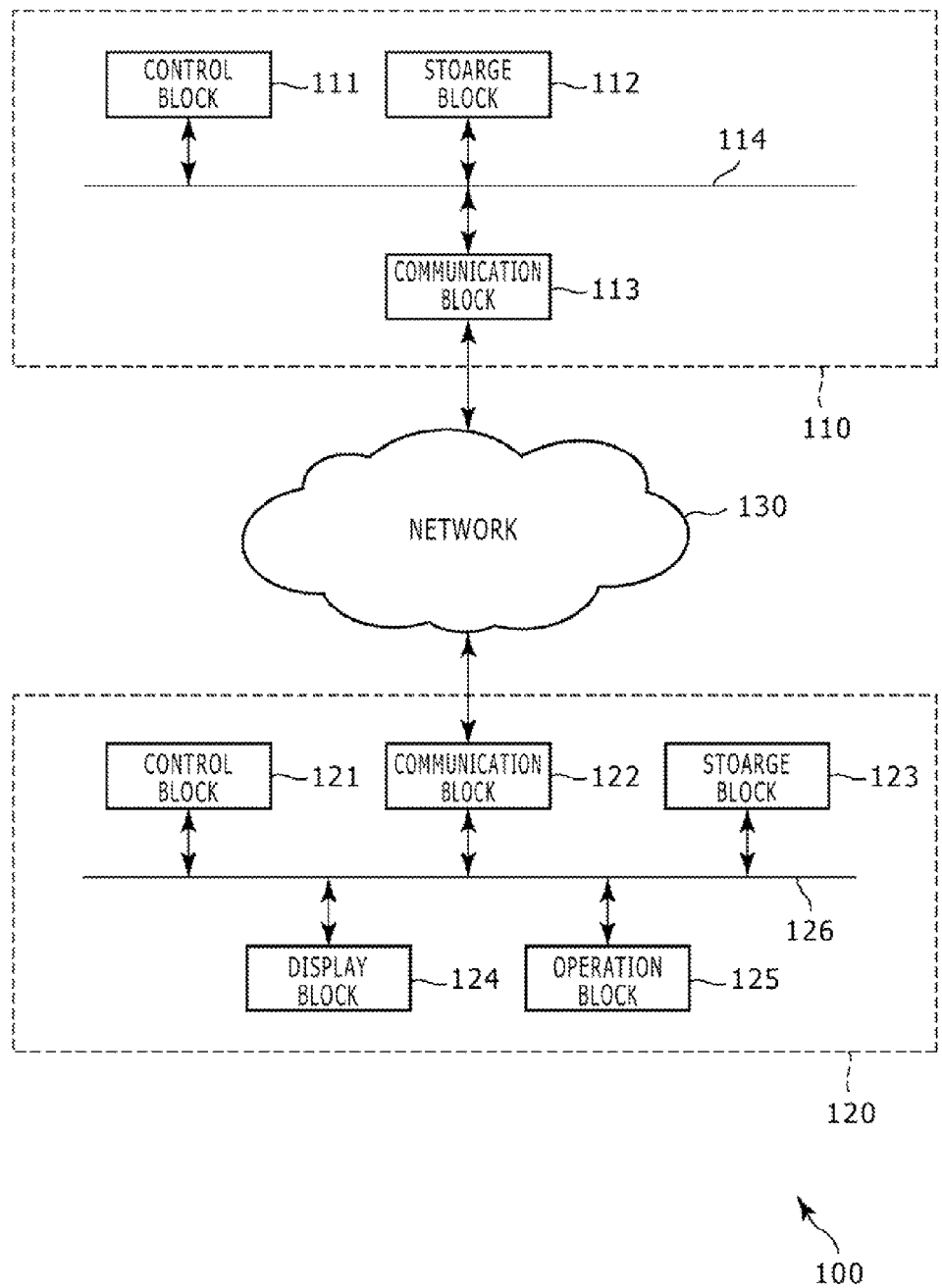
FIG. 1 is a diagram for describing an outline of a hardware configuration of an information processing system in a first embodiment.

Referring to FIG. 1, there is shown a diagram for describing a hardware configuration of an information processing system related with the present embodiment. As shown in FIG. 1, an information processing system 100 includes a server 110 and a terminal 120 interconnected via a network 130 (the Internet for example). It should be noted that, in FIG. 1, only one terminal 120 is shown, but two or more terminals 120 may be arranged. In addition, terminals 120 may include not only same types but also different types. To be more specific, the terminal 120 is equivalent to a family stationary game device, a portable game device, a portable terminal such as a portable phone, a personal computer, a tablet, or another electronic device, for example.

The server 110 includes a control block 111, a storage block 112, and a communication block 113. The control block 111 is a CPU or the like for example and operates as instructed by a program stored in the storage block 112. The storage block 112 is configured by an information recording medium such as a hard disk, a ROM, or a RAM, for example, and holds programs that are executed by the control block 111. Further, the storage block 112 operates as a work memory of the control block 111.

The communication block 113 is a network interface and transmits and receives information via the network 130 as instructed by the control block 111. It should be noted that the control block 111, the storage block 112, and the communication block 113 are interconnected via a bus 114.

Further, the terminal 120 includes a control block 121, a communication block 122, a storage block 123, a display block 124, and an operation block 125, for example. Likewise, the members 121 through 125 are interconnected via a bus 126. As with the server 110 described above, the control block 121 is a CPU or an MPU for example and operates as instructed by a program stored in the storage block 112. The storage block 123 is configured by a hard disk, a ROM, or a RAM, for example and provides an information recording medium for holding programs that are executed by the control block 121. In addition, the storage block 123 also operates as a work memory of the control block 121.

The operation block 125 is configured by an interface such as a keyboard, a mouse, a controller, and buttons, for example and outputs contents of an instructive operation to the control block 121 in accordance with the instructive operation given by a user. The display block 124 is a liquid crystal display, a CRT display, or an organic EL display, for example, and displays information as instructed by the control block 121. Also, the terminal 120 may be configured as having a so-called touch panel with the display block 124 and the operation block 125 unitized.

It should be noted that a program that is processed by the control block 111 and the control block 121 may be provided as downloaded via a network or in various types of computer-readable information recording medium such as a CD-ROM or a DVD-ROM, for example. It should also be noted that the configurations of the server 110 and the terminal 120 described above are illustrative only and therefore not limited to these configurations. Functional configurations of the server 110 and the terminal 120 will be detailed later.

The following describes one example of the functional configuration of the server 110 in the present embodiment. FIG. 2 is a diagram for describing the functional configuration of a server for realizing functions in the present embodiment. As shown in FIG. 2, the server 110 includes a login information acquisition block 131, a terminal ID registration block 132, a terminal ID storage block 133, a terminal information acquisition block 134, a terminal information storage block 135, a monitor block 136, an operation information acquisition block 137, a delivery information generation block 138, and a delivery block 139, for example. It should be noted that the functional configuration shown in FIG. 2 is illustrative only and therefore the present embodiment is not limited to this configuration.

The login information acquisition block 131 acquires login information from two or more terminals 120. Here, login information includes a user ID for identifying a user (user identification information) and a terminal ID (terminal identification information) for identifying each terminal 120. Here, login is equivalent to the login to a service (community) provided by the information processing system 100 and executing login allows a user to receive the provision of a service at each user terminal 120. It should be noted that services provided by the information processing system 100 are of various types; for example, a service for allowing game playing on the terminal 120, a service for providing content such as movies, a service for allowing a use of a bulletin board, and service for allowing a use of chat functions.

The terminal ID registration block 132 relates each user ID acquired by the login information acquisition block 131 with two or more terminal IDs and registers the related IDs in the terminal ID storage block 133. For example, if the login information acquisition block 131 acquires login information including user ID: U1 and terminal ID: t1 and then login information including user ID: U1 and terminal ID: t2, the terminal ID registration block 132 relates user ID: U1 with the terminal ID storage block 133 and stores terminal ID: t1 and t2 as shown in FIG. 3. It should be noted that FIG. 3 shows that two terminal IDs are stored for one user ID. However, the relation is not limited to this case; for example, other number of terminal IDs, three or more for example, may be related with one user ID. It should be noted that, for the terminal ID for identifying the terminal 120, an IP address (Internet Protocol address) or a MAC address (Media Access Control address) is used. In addition, a configuration may be available in which a terminal ID is entered by a user or a unique ID (PSN: Processor Serial Number) of the CPU of the terminal 120 is used.

The terminal information acquisition block 134 acquires terminal information of the terminal 120. Here, terminal information is equivalent to information indicative of a performance of the terminal 120 such as a resolution of the display block 124, a CPU performance, and memory capacity, for example. In addition, terminal information may include information about such a state of connection between each terminal 120 and the server 110 as a network delay. Further, if a terminal 120 is connected to the server 110 via another terminal 120, information about a state of connection between these terminals 120 may be included in the terminal information.

Also, this terminal information may be configured to be included in the above-mentioned login information or to be acquired by the corresponding terminal 120 in accordance with a request instruction from the terminal information acquisition block 134, for example. In addition, the acquired terminal information is related with the corresponding terminal ID to be stored in the terminal information storage block 135, for example.

The monitor block 136 monitors the state of connection between each terminal 120 and the server 110 in a login state at predetermined intervals. To be more specific, the monitor block 136 monitors the state of connection between each terminal 120 stored in the terminal ID storage block 133 and the server 110, for example. If a terminal 120 is connected with the server 110 via another terminal 120, the monitor block 136 monitors the state of connection between this terminal 120 and another terminal 120. Monitoring is executed by transmitting, by the monitor block 136, a signal for checking whether or not the connection state between the server 110 and the terminal 120 maintained at predetermined intervals and receiving a reply signal to the transmitted signal from the terminal 120 concerned.

The operation information acquisition block 137 acquires operation information corresponding to various operation instructions entered through the terminal 120. To be more specific, the operation information includes operation information for giving an instruction for delivering delivery information delivered to a terminal 120 in use by the user to another terminal 120 in use by this user, for example.

The delivery information generation block 138 generates two or more pieces of delivery information to be delivered to each terminal 120 registered for each user ID. It should be noted that each terminal 120 is identified by the terminal ID stored in the terminal ID storage block 133 as related with each user ID as described above. It should also be noted that a configuration may be provided in which these pieces of delivery information are generated in accordance with a user operation instruction or these pieces of delivery information are generated on the basis of predetermined conditions, or these pieces of delivery information are generated in both the configurations. Also, these two or more pieces of delivery information may be totally or partially duplicate. Further, the above-mentioned conditions are equivalent to predetermined conditions that, if image information corresponding to game and chat functions is provided by the information processing system 100, image information for game play and image information for realizing chat function are provided, for example.

The delivery block 139 delivers two or more pieces of delivery information generated by the delivery information generation block 138 to each of two or more terminals 120 registered for each user ID. For example, the delivery block 139 transmits two or more different pieces of delivery information generated by the delivery information generation block 138 to the corresponding terminals 120 in accordance with the terminal information stored in the terminal information storage block 135. In this case, if two pieces of terminal information different from each other in image resolution is stored for one user ID for example, the image information requiring higher resolution is delivered to the terminal 120 having a higher resolution and the image information requiring only lower resolution is delivered to the terminal 120 having a lower resolution. To be more specific, in the above-mentioned example, the image information of game is delivered to the terminal 120 having higher resolution and the image information for realizing chat is delivered to the terminal 120 having lower resolution, for example.

In addition, a configuration may be provided in which the delivery block 139 delivers two or more different pieces of delivery information generated by the delivery information generation block 138 are delivered on the basis of a monitor result acquired by the monitor block 136. For example, a configuration may be provided that, if two pieces of termination information are registered for one user ID and the connection of one of the these two terminals 120 is found disconnected by the monitor block 136, one of two pieces of delivery information is delivered to the terminal 120 kept in a connected state. To be more specific, for example, a configuration may be provided in which, if main delivery information and sub delivery information are delivered to two terminals 120 and if the connection of the terminal 120 (the main terminal) to which the main delivery information is delivered is found connected and the connection with the terminal 120 (the sub terminal) to which the sub delivery information is delivered is found disconnected, then the sub delivery information is displayed on the display block 124 of the main terminal 120 as a so-called head-up display or a separate window. In this case, the delivery block 139 delivers two or more pieces of delivery information to the main terminal 120 along with an instruction for specifying a display method as described above, for example. It should be noted that the main terminal 120 is equivalent to the terminal 120 mainly used by the user that is the terminal 120 having a larger display screen, the terminal 120 having higher resolution, or the terminal 120 having higher CPU performance, namely, higher in performance than the sub terminal 120. Further, a configuration may be provided in which these main terminal 120 and sub terminal 120 are specified by the user. In addition, a configuration may be provided that, in accordance with a degree of the network delay in the connection and connection state between the delivery block 139 and the terminal 120, the delivery block 139 delivers two or more pieces of deliver information to different terminals 120 related with one user ID and registered. Namely, if one piece of delivery information is moving image information corresponding to a race game for example, this moving image information is delivered to the terminal 120 having good connection state and higher response.

Further, if the connection of only the sub terminal 120 is found maintained for example, a configuration may be provided that the delivery block 139 can continue only the processing enabled in the sub terminal 120. For example, a configuration may be provided in which, if the delivery information in the sub terminal 120 is delivery information corresponding to a chat function, game playing is disabled on the main terminal 120 but only the chat function corresponding to this game can be continued on the sub terminal 120. Also, a configuration may be provided that, in accordance with a user operation instruction, the delivery block 139 can select to which of the terminals 120 the delivery information is to be delivered.

Figure 4:
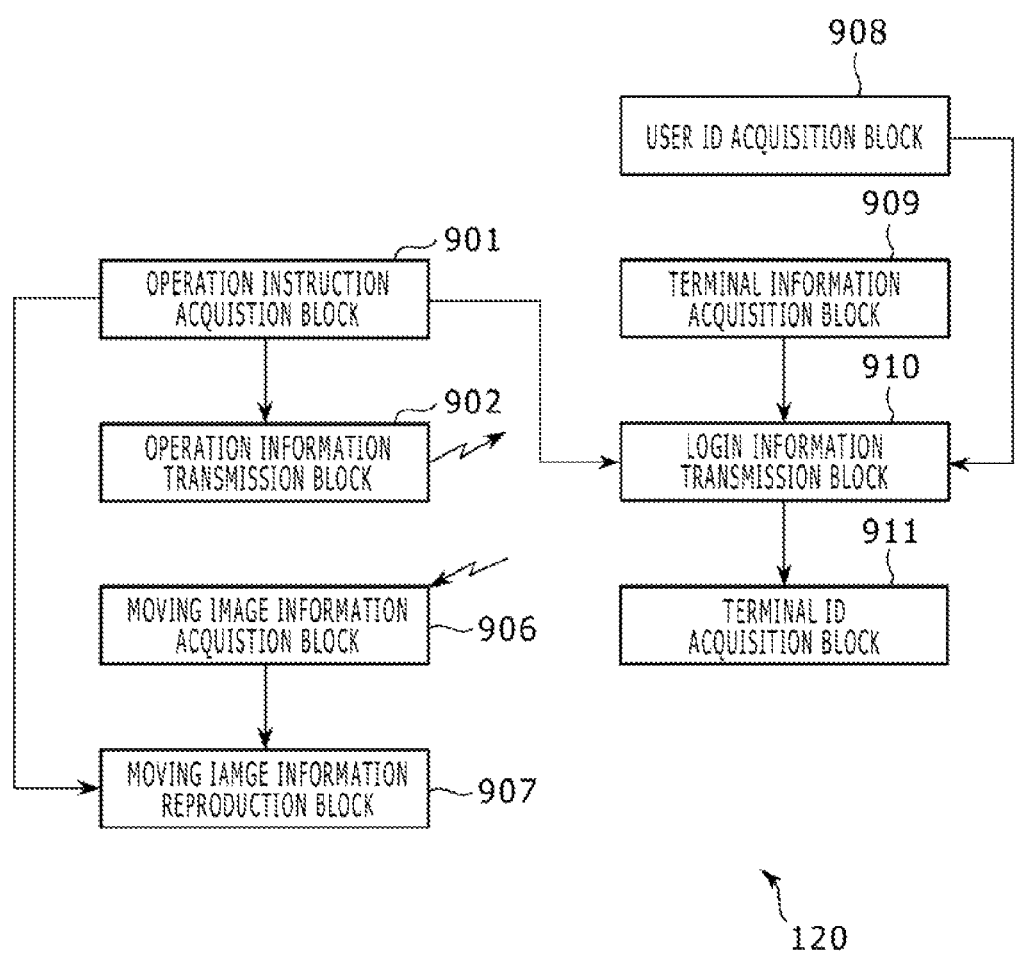
FIG. 4 is a diagram for describing a functional configuration of a terminal in a second embodiment.

The following describes the main functional configuration of the terminal 120 in the present embodiment. As shown in FIG. 4, the terminal 120 includes an operation instruction acquisition block 901, an operation information transmission block 902, a moving image information acquisition block 906, a moving image information reproduction block 907, a user ID acquisition block 908, a terminal information acquisition block 909, a login information transmission block 910, and a terminal ID acquisition block 911, for example.

The operation instruction acquisition block 901 acquires an operation instruction entered through the operation block 125 of the terminal 120. Operation instructions as used here are indicative of various kinds of operation instructions such as an operation instruction for giving an instruction for logging in on a service provided by the server 110 and, if game moving image information is delivered to the terminal 120, an operation instruction for moving or operating an object of operation in a game concerned, for example. The operation information transmission block 902 transmits operation instructions to the server 110 as operation information.

The user ID acquisition block 908 acquires user identification information (user ID) for identifying users. To be more specific, the user ID acquisition block 908 acquires a user ID that the user entered, for example. It should be noted that a configuration may be provided in which this user ID is acquired via the operation block 125 or entered in another method in which a predetermined card is passed over a card reader for example.

The moving image information acquisition block 906 acquires moving image information for realizing a service provided by the server 110. Then, the moving image information reproduction block 907 displays the acquired moving image information on the display block 124. In the above-mentioned example, moving image information was described; however, it is also practicable to acquire other image information and other delivery information such as voice information and reproduce the acquired information. It should be noted that delivery information acquisition means, delivery information reproduction means cited in the scope of claims herein correspond to the moving image information acquisition block 906 and the moving image information reproduction block 907 respectively, for example.

The terminal information acquisition block 909 acquires terminal information about the terminal 120. As described above, terminal information is equivalent to the information about the performance of the terminal 120 such as the resolution of the display block 124 and CPU performance of the terminal 120. The terminal ID acquisition block 911 acquires a terminal ID for identifying each terminal 120. As described above, a MAC address or the like is used for a terminal ID.

The login information transmission block 910 transmits login information including login request instructions to the server 110 along with a user ID and a terminal ID acquired by the user ID acquisition block 908. It should be noted that this login information may include terminal information acquired by the terminal information acquisition block 909.

According to the present embodiment, one user can log in on a service provided by the server 110 by use of two or more terminals 120, thereby displaying two or more different pieces of image information (including moving image information) included in a service provided by the server 110 onto the display blocks 124 of these two or more terminals 120.

It should be noted that the present invention is not limited to the embodiment described above and therefore various changes and modifications thereto may be made. For example, configurations substantially the same as those shown in the embodiment described above, configurations providing substantially same effects as those shown in the embodiment described above, or configurations achieving substantially same objects as those shown in the embodiment described above can replace those shown in the embodiment described above.

The Second Embodiment

The following describes a second embodiment of the present invention. It should be noted that, in what follows, the description of same points as those in the first embodiment will be skipped. In the present embodiment, the delivery information that is displayed by the delivery information generation block 138 in the first embodiment described above is equivalent to the delivery information for providing a community service in a virtual space to be described later.

Therefore, first, in order to facilitate the understanding of community services in the present embodiment, a moving image with moving image information (delivery information) generated by the information processing system 100 in the present embodiment displayed on the display block 124 of the terminal 120 will be described as one example. It should be noted that the following examples are illustrative only and therefore the present embodiment is not limited thereto.

For example, in a community service in the present embodiment, a user selects items, from broader concept to narrow concept, to reach a desired community. To be more specific, the user first selects one category (an item of broader content) from a displayed category group, then one type (an item of middle concept) from a type group of content belonging to the selected category as the narrower concept, and then one content (an item of narrower concept) from a content group included in the selected type, finally reaching a community corresponding to the selected content. It should be noted that the above-mentioned categorization of broader, middle, and narrow is illustrative only and therefore more detail categorization is practicable. The following gives more specific description with reference to FIGS. 5 through 7. It should be noted that, in what follows, an example will be described in which items of broader concept are equivalent to a category plate and items of narrower concept are equivalent to a content plate to be described later; however, the present embodiment is not limited thereto. For example, a content plate is not limited to that described later as long as the content plate is the display of one community space in the virtual space.

Figure 5:
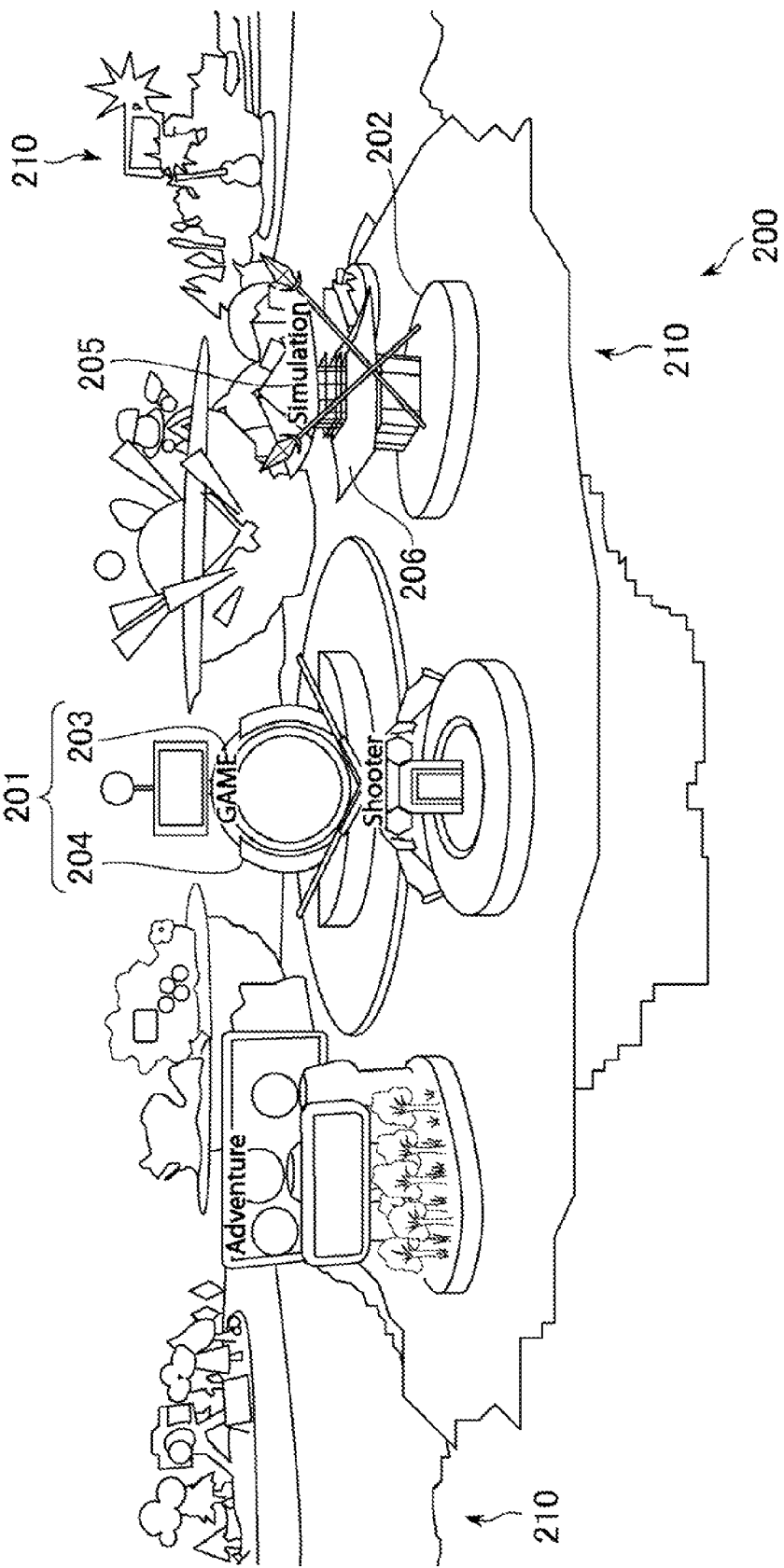
FIG. 5 is a diagram for describing one example of a category plate in the second embodiment.

For example, if the user activates an application related with a community provided by the information processing system 100 through the terminal 120 and logs in on this community as shown in FIG. 5, a category plate 210 that is an insular region sorted by category on a virtual space 200 is displayed on two or more display blocks 124. Here, category is equivalent to a category such as game, music, or movie, for example.

Each category plate 210 includes a region 201 indicative of each category and a region 202 acquired by further dividing each category by type arranged therearound, for example. To be more specific, in the case of the category plate 210 about game, the region 201 indicative of category is arranged with a sign 203 indicative of the name of a game category and an object 204, around which an object 206 including a signs (name) 205 indicative of a game type such as adventure game, shooting game, or simulation game is arranged, for example, as shown at the center of FIG. 5.

Here, these objects 204 and 206 are designed in shapes and colors so as to give associations of the above-mentioned categories and types. To be more specific, in the case of the object 206 indicative of a type such as shooting game, a sign 205 indicative of name "Shooter" or the like along with a gun, for example, as shown in FIG. 5.

It should be noted that a configuration may be provided in which sizes and areas of each category plate 210 and the objects 206 indicative of each type change depending on the number of users who logs in on a community concerned and belongs to a category concerned. For example, a configuration may be provided in which, if, of the users logging in on the community concerned, there are many users who are listening to music and less users who is playing a game, then the size and area of the category plate 210 of music are displayed smaller than the size and area of the category plate 210 of game. Further, a configuration may be provided, if, of the users playing games, the number of users playing a shooting game is less than the number of users playing a simulation game, for example, then the region of the object 206 corresponding to the shooting game is displayed smaller than that of the object 204 corresponding to the simulation game. Namely, a configuration may be provided that the sizes of the category plate 210 and each object 206 change depending on the number of users belonging to each category or each type. Here, counting or the like of the number of users belonging to the category concerned or the type concerned is executed on the basis of activity information transmitted from the terminal 120 corresponding to each user at predetermined intervals, the activity information and the like being detailed later.

Figure 6:
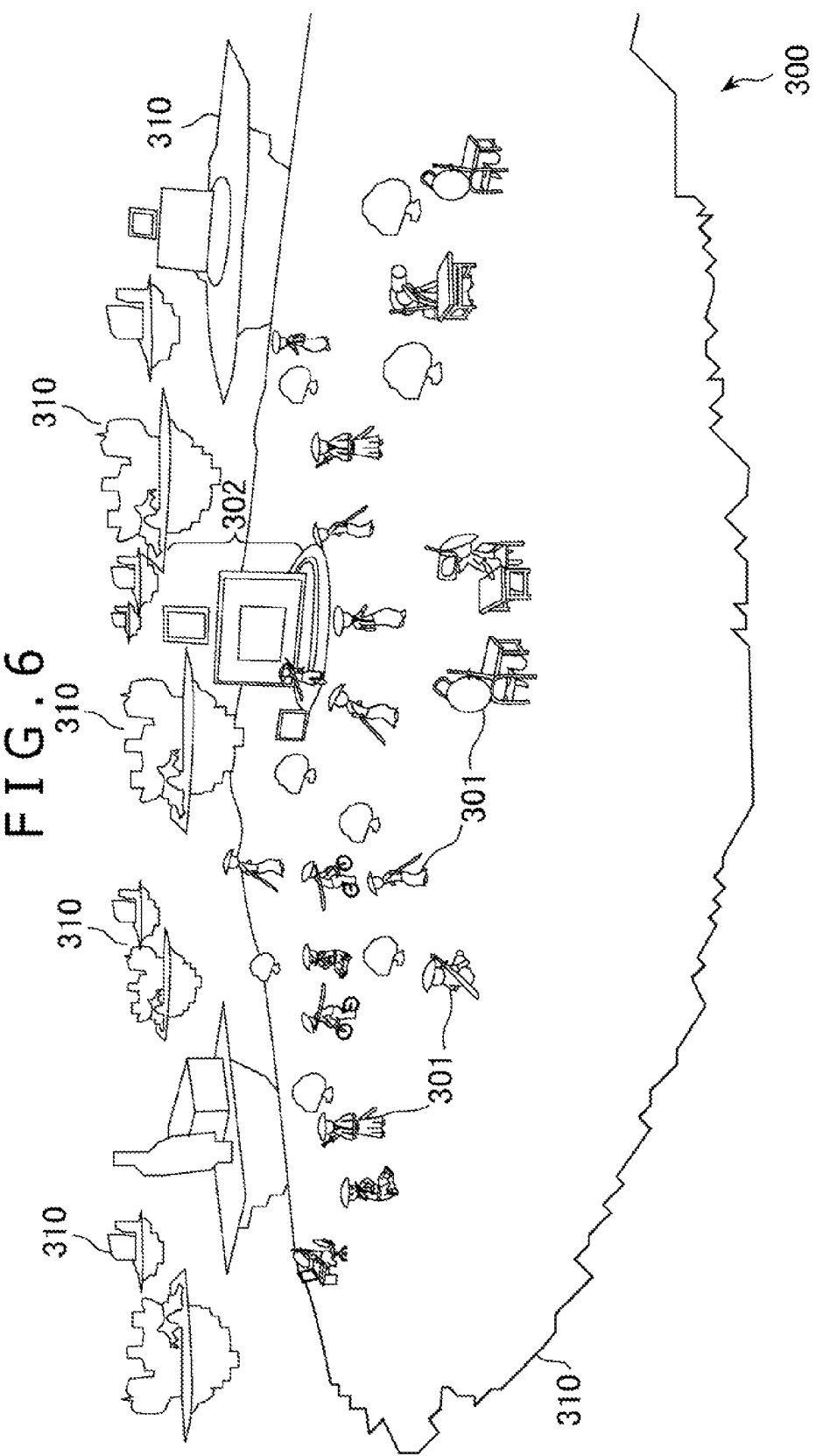
FIG. 6 is a diagram for describing one example of a content plate in the second embodiment.

Next, when the user selects one object 206 from one category plate 210 (the category plate of game for example), two or more content plates 310 corresponding to the selected object 206 arranged in a virtual space 300 are displayed on the display block 124 as shown in FIG. 6. These content plates 310 correspond to the games of the type concerned (shooting for example). In addition, these content plates 310 are arranged in the virtual space 300 in an insular manner as separated from each other as shown in FIG. 6, for example. It should be noted that operating the operation block 125 of the terminal 120 by the user to move the viewpoint arranged in the virtual space 300 allows the display of the content plates 310 in various directions and from various angles. To be more specific, this allows the moving of the viewpoint to another content plate 310 to display the content plate 310 in various directions and from various angles and display a part of the region of the one content plate 310 in various directions and from various angles, for example.

Figure 7:
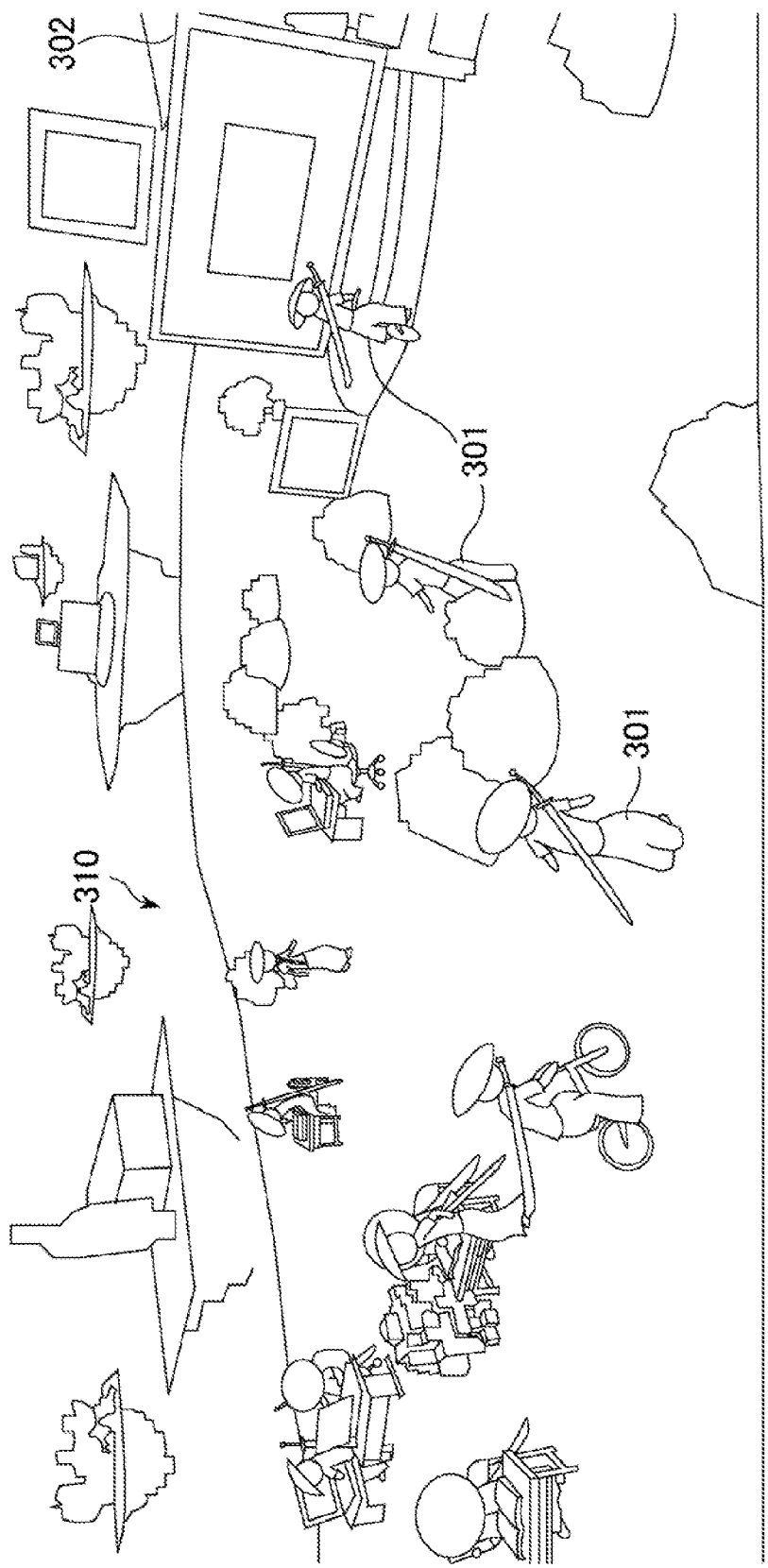
FIG. 7 is a diagram for describing one example of a content plate in the second embodiment.

The following describes details of each content plate 310. Each content plate 310 is indicative of a community as classified by content. To be more specific, the content plate 310 shown at the center of FIG. 6 in an enlarged manner is indicative of the content plate 310 of one game, for example. FIG. 7 shows further details of the content plate 310.

As shown in FIG. 6 and FIG. 7, two or more objects (avatars 301) indicative of characters corresponding to users are arranged on the content plate 310. It should be noted that each of these users may be some of the users who logged in on the information processing system 100. Namely, all users who are in the logged in state need not be displayed on the content plate 310. In this case, these some users are extracted from all the users in the logged in state on the basis of predetermined criteria. To be more specific, given users may be extracted at random from the users in the logged in state for example or a configuration may be provided in which users executing a particular activity such as fishing for example is displayed with priority. Further, the predetermined criteria may be the criteria according to a country or region in which terminals 120 are located. Still further, these criteria may be combined.

In addition, a function object 302 having various functions for example may be arranged in some of the content plates 310. To be more specific, this function object 302 is the object of a screen on which information related with the community of game concerned is displayed and a moving image related with this game may be displayed on this screen or a link to a page on the Internet related with this community may be attached to this screen, for example. Also, the function object 302 may be in accordance with a predetermined event such as when users execute a predetermined operation or users more than a predetermined number gather at a predetermined content plate, for example. In addition to the cases shown above, the function object 302 may be an event in which a game starts, this game being playable by users in cooperation corresponding to content plate concerned if a predetermined criterion is satisfied on which a moving image of a predetermined object corresponding to the content concerned is displayed. In this case, the function object 302 may correspond to an event in which a monster is newly displayed separately from an event on the screen shown in FIG. 6.

Each avatar 301 is arranged in a region corresponding to an activity of each user and controlled to execute an action corresponding to an activity currently executed by the user or an activity done within a predetermined period of time from the current point of time. That is, basically, in the present embodiment, each user does not operate each corresponding avatar 301, but a movement and an action are executed in accordance with an activity done by the user. It should be noted that activity information indicative of each activity is transmitted from the terminal 120 corresponding to each user, details of which will be described later.

Here, the activity includes a life activity and a content activity. A life activity is an activity in a real-life of user indicative of taking a meal, moving, or doing work for example and a content activity is indicative of an activity on the basis of predetermined content such as playing a predetermined game, listening to predetermine music, or viewing a predetermined movie for example. If a live activity changes, the avatar moves to a partial region corresponding to a life activity of destination of change on the same content place; if a content activity changes, the avatar moves to a region corresponding to a life activity on a different content place. It should be noted that content activity concerned is identified by a content ID (content identification information) and life activity concerned is identified by an activity ID (activity identification information), for example, details of which will be described later.

For example, if activity information concerned includes information indicative that the user is working, then an action in which the user sits at a desk and is doing work by use of a PC is expressed. If activity information includes information indicative that the user is moving on a vehicle (a car, a train, an airplane, or a ship for example), a manner in which the user is riding on a vehicle (an action of driving or an action of holding on a strap of a train, for example) is expressed. In this case, a configuration may be provided in which different actions are expressed depending on moving means (a car or a train for example). If activity information concerned includes information indicative that the user is taking a meal, then an action in which the avatar is taking a meal is expressed by use of motion data corresponding to an action in which a meal is being taken. Also, if activity information from the terminal 120 includes information to be described later indicative that the user is drinking alcohol, for example, an action of drinking is expressed along with a glass of beer or the like. Namely, the avatar 301 is indicated by an action indicative of each life activity of the user, that is, an action associated with a life activity of the user.

In addition, partial regions corresponding to the activities (life activities) of the user such as doing work and taking a meal are set to each content plate 310 and the avatar 301 is displayed so as to do actions in the partial regions corresponding to the life activities described above. Further, the actions concerned to be expressed may include a fishing action, an action of moving on a train, a running action, a bicycling action, a walking action, and so on regardless of actions in which work is being done and a meal is being taken. Still further, the partial regions corresponding to these actions may overlap with each other or the areas or sizes there of may be different from each other.

Figure 8:
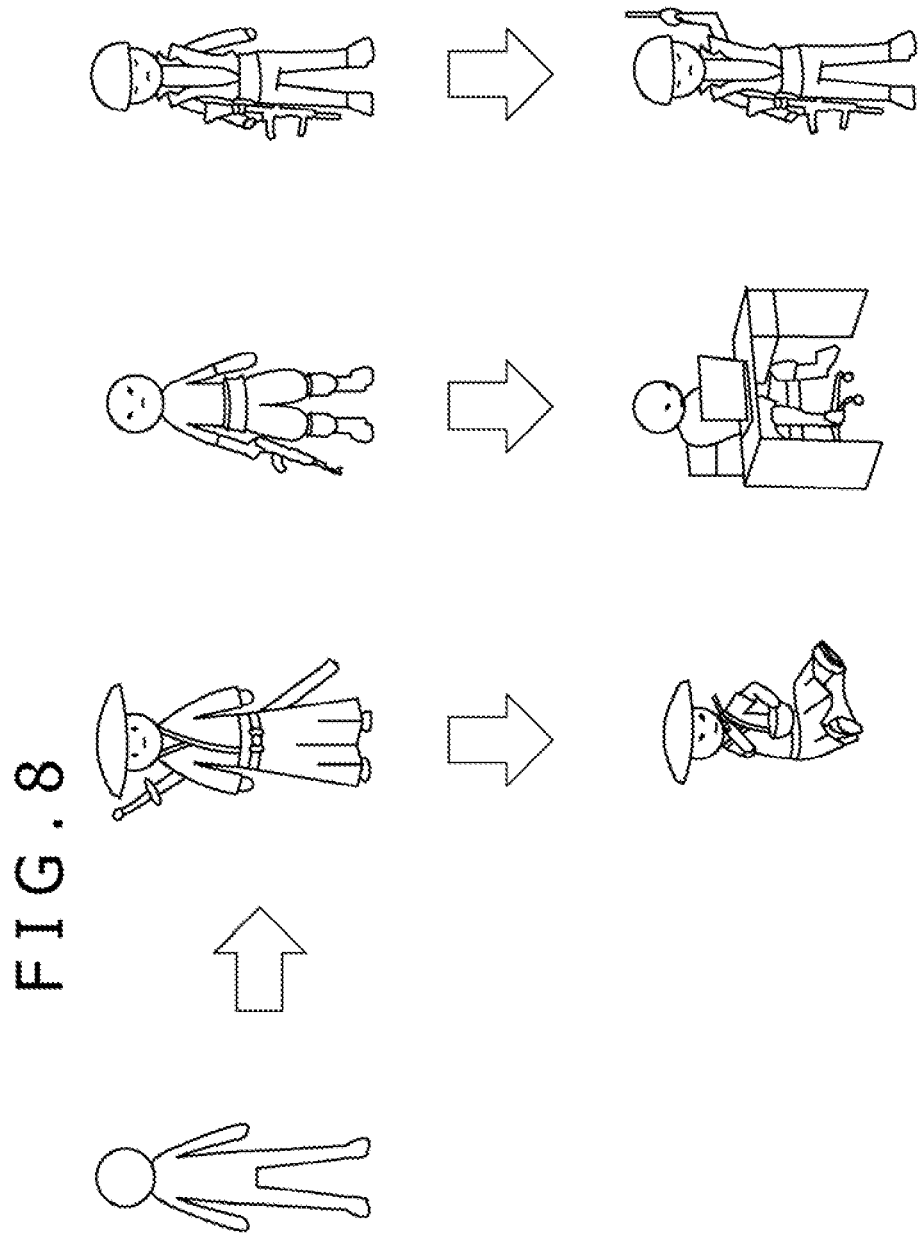
FIG. 8 is a diagram for describing one example of avatars in the second embodiment.

Besides, each avatar 301 is displayed on the content plate 310 so as to act in a costume corresponding to each time of content. To be more specific, if a game is being played, the avatar is displayed so as to act in a costume indicative of this game as shown in FIG. 8, for example. Namely, each costume is set for each item of content (each game for example) and each item of content can be associated with each costume. It should be noted that, in addition to costumes, items unique to the content concerned may be display. To be more specific, for each item of content, textures indicative of costumes are mapped (at the upper right in FIG. 8) to the model data of the avatar 301 in a basic shape as shown to the left in FIG. 8 and then the costumed avatar is displayed in the actions corresponding to life activities (refer to the lower right in FIG. 8). It should be noted that, in FIG. 8, from left to right, the avatar during taking a meal, the avatar during working, and the avatar during moving on a train are shown. It should also be noted that, in the example described above, a configuration in which textures are mapped has been described as a configuration in which the costumes of the avatar 301 is changed; it is also practicable to use other configurations in which the model data of the avatar 301 are changed or animation data are changed, for example.

Also, a configuration may be provided that each avatar 301 is displayed in a costume corresponding to the content executed last. To be more specific, after playing a certain game, even after ending this played game, the avatar is displayed in the costume of this game onto the corresponding content plate 310 during a predetermined period of time until another item of content such as a next game, music, a movie or the like is executed, for example. It should be noted that, if user activities (life activities) for example change during the predetermined period of time concerned, the avatar is moves to a corresponding region and display therein so as to express an action from a life activity (moving by train for example) before the change to a life activity (taking a meal for example) after the change. On the other hand, if user content activities change, the avatar moves to a corresponding content plate to be displayed in accordance with the current life activity.

Figure 9:
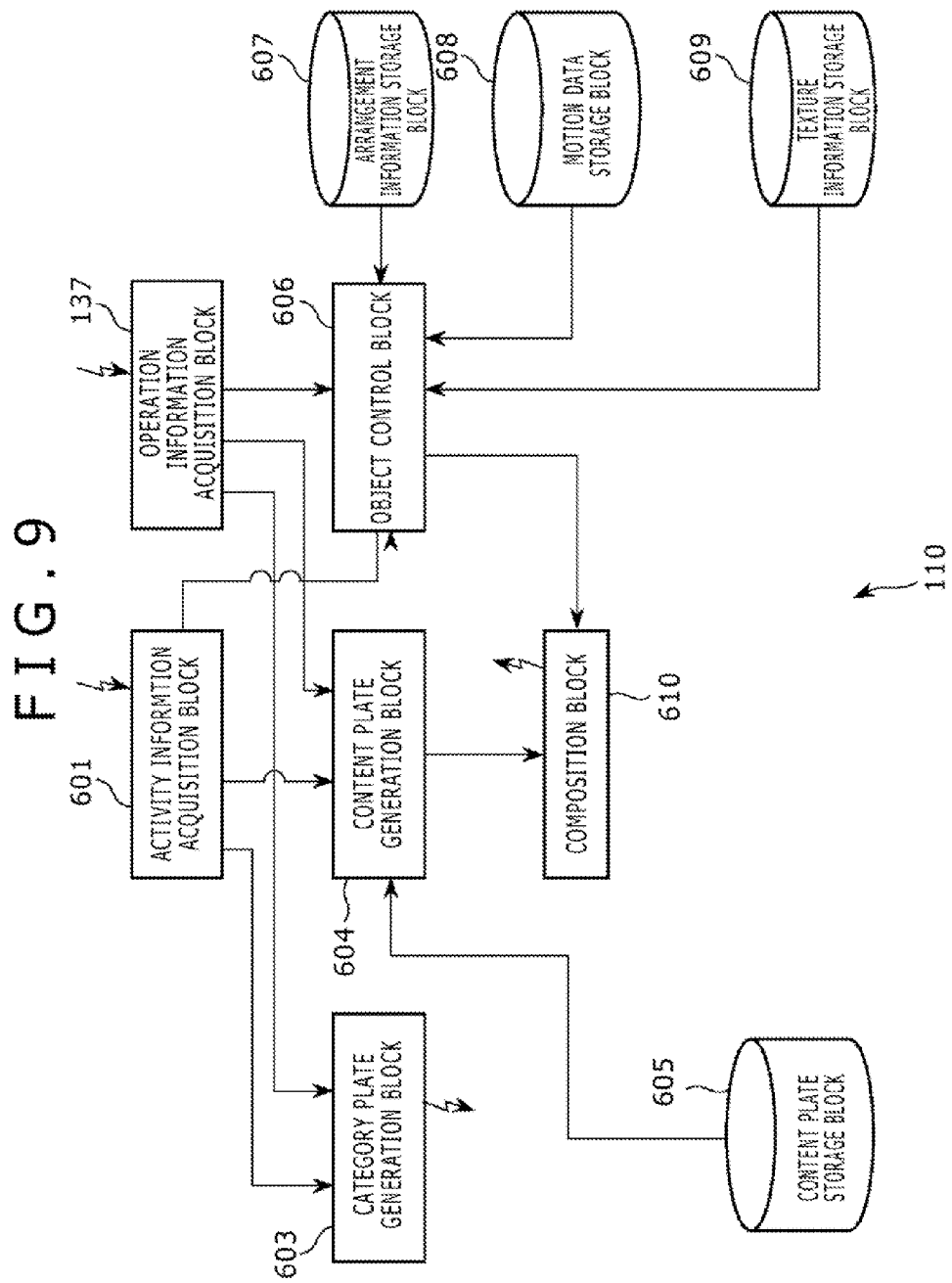
FIG. 9 is a diagram for describing one example of a functional configuration of a server in the second embodiment.

The following describes, with reference to FIG. 9, a functional configuration of the server 110 configured to realize the display operation described above. In the present embodiment, the delivery information generation block 138 and the delivery block 139 in the server 110 of the first embodiment described before include an activity information acquisition block 601, a category plate generation block 603, a content plate generation block 604, a content plate storage block 605, an object control block 606, an arrangement information storage block 607, a motion data storage block 608, a texture information storage block 609, and a composition block 610, for example, as shown in FIG. 9.

The activity information acquisition block 601 sequentially acquires activity information from each terminal 120 corresponding to the user. Here, the activity information includes a user ID, a content ID, and an activity ID, for example. This activity information is transmitted from each terminal 120 at predetermined intervals and the activity information acquisition block 601 sequentially acquires these pieces of activity information. It should be noted that the functional configuration of the terminal 120 will be described later. As described above, a content ID is information for identifying each content activity and an activity ID is information for identifying each life activity. A user ID is information for identifying each user.

The operation information acquisition block 137 acquires various kinds of such operation information from each terminal 120 as category selection instruction information for selecting a category plate 210, content selection instruction information for identifying the content plate 310, and viewpoint information moving a viewpoint in the virtual space 300. To be more specific, the operation information is acquired along with each user ID.

When the user logs in on a community provided by the information processing system 100 for example, the category plate generation block 603 generates, in the virtual space 300, image information indicative of category plates 210 such as two or more category plates 210 arranged as shown in FIG. 5. To be more specific, a manner in which a virtual space 200 with category plates 210 arranged separately from each other is viewed from a given viewpoint is generated as image information, for example. It should be noted that a configuration may be provided in which the user moves the viewpoint concerned through the operation block 125 or rotates the entire virtual space 200 with two or more category plates 210 arranged. These configurations are generated as image information by a known three-dimensional computer graphics technique, for example. Also, the image information thus generated is displayed on the display block 124 of the terminal 120 in accordance with a user operation instruction.

On the basis of acquired activity information, the content plate generation block 604 generates image information with two or more content plates 310 arranged in the virtual space 300 as shown in FIG. 6 for example. This image information is generated after the user selects a desired category plate 210 for example. Likewise, the content plate generation block 604 generates this image information by a known three-dimensional computer graphic technique for example.

Figure 10:
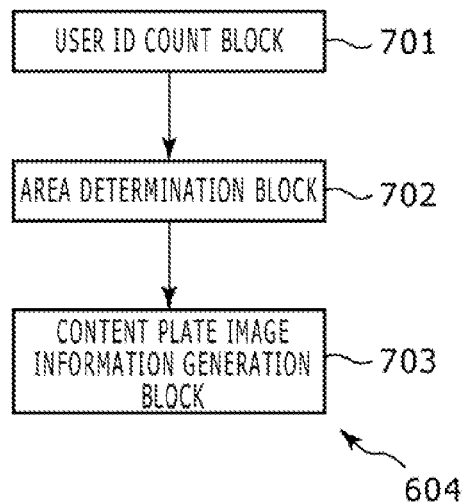
FIG. 10 is a diagram for describing a functional configuration of a content plate generation block shown in FIG. 9.

To be more specific, the content plate generation block 604 includes a user ID count block 701, an area determination block 702, and a content plate image information generation block 703 as shown in FIG. 10 for example. The user ID count block 701 counts the number of user IDs for each content ID on the basis of the content ID included in an acquired activity information. To be more specific, that the activity information acquisition block 601 acquired 100 different user IDs for content ID: G1 and 150 different user IDs for content ID: G2 within a predetermined period of time are counted, for example.

On the basis of the number of user IDs for each counted content ID, the area determination block 702 determines an area and a size of each content plate 310. In the example described above, the number of user IDs is 100 for content ID: G1 and 150 for content ID: G2 for example, so that the area of the content plate 310 for content ID: G2 is determined to become 1.5 times larger than the area of the content plate 310 for content ID: G1, for example. It should be noted that a configuration may be provided in which any content plates 310 with the number of user ID being 0 or lower than a predetermined number are not displayed.

The content plate image information generation block 703 acquires image information (content plate image information) indicative of each content plate 310 from the content plate storage block 605 and, at the same time, generates image information of the content plate 310 having an area determined by the area determination block 702 mentioned above. Here, content plate storage block 605 stores each content plate image information as related with each content ID, for example. Namely, on the basis of the content ID included in the acquired activity information mentioned above, the content plate image information generation block 703 acquires the corresponding content plate image information.

Figure 11:
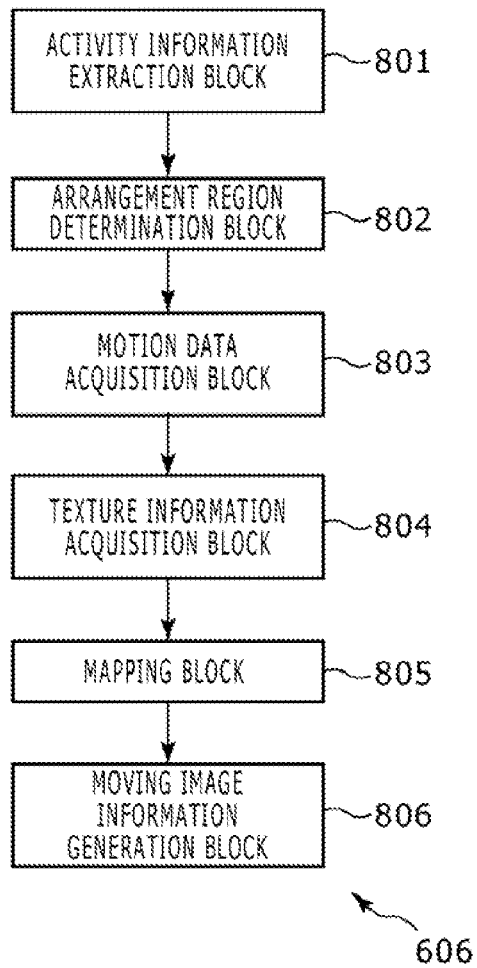
FIG. 11 is a diagram for describing a functional configuration of an object control block shown in FIG. 9.

On the basis of viewpoint information included in activity information or operation information, the object control block 606 controls the display and action of an object corresponding to the user in the virtual space 300. To be more specific, the object control block 606 includes an activity information extraction block 801, an arrangement region determination block 802, a motion data acquisition block 803, a texture information acquisition block 804, a mapping block 805, and a moving image information generation block 806 as shown in FIG. 11 for example.

The activity information extraction block 801 extracts the predetermined number of pieces of activity information on the basis of predetermined criteria from two or more pieces of activity information acquired by the activity information acquisition block 601. Here, the predetermined criteria are that the avatars 301 to be displayed on the content plate 310 is randomly extracted so as to be equal to or lower than a predetermined number and particular activity information such as an avatar being fishing is preferentially extracted, as described above for example.

On the basis of extracted activity information, the arrangement region determination block 802 determines a partial region in the corresponding content plate 210, objects corresponding to users being arranged in this partial region. To be more specific, on the basis of the content ID and the activity ID included in the extracted activity information, the arrangement information storage block 607 is referenced for determining this partial region, for example. It should be noted that the arrangement information storage block 607 stores relates category ID, content ID, activity ID, and partial region ID with each other and stores the related IDs, as shown in FIG. 12 for example. It is also practicable to relate the content ID indicative of content type and store the related content ID. It should be noted that a configuration may be provided in which some partial regions include all regions of the content plate 210.

The following describes an example in which the extracted activity information is user ID: U1, content ID: G1, activity information: a1 and the arrangement information stored in the arrangement information storage block 607 is as shown in FIG. 12. In this case, the arrangement region determination block 802 acquires partial region ID: r1 on the basis of content ID: G1 and activity ID: a1 included in the extracted activity information. Consequently, the arrangement region determination block 802 determines, as an arrangement region, the region identified by content ID: G1 and partial region ID: r1 as the arrangement region of an object (the avatar 301) corresponding to user ID: U1. In other words, for this object, the partial region identified by partial region ID: r1 of the content plate 210 of content ID: G1 is determined as an arrangement region.

On the basis of the activity ID of the extracted activity information, the motion data acquisition block 803 acquires motion data corresponding to the activity ID from the motion data storage block 608, for example. Here, the activity ID and the motion data are stored as related with each other in the motion data storage block 608. In the case of the example described above, for example, the motion data acquisition block 803 acquires the motion data related with activity ID: a1.

On the basis of the content ID of the extracted activity information, the texture information acquisition block 804 acquires texture information to be mapped on the avatar 301 from the texture information storage block 609. Here, texture information is stored as related with each content ID in the texture information storage block 609. Each piece of texture information corresponds to a costume unique to each content, for example. Also, the mapping block 805 maps the acquired texture on the corresponding object. Consequently, the avatar 301 is displayed in a costume corresponding to the content.

In accordance with acquired motion data, the moving image information generation block 806 generates moving image information for making the avatar 301 mapped with a texture act in a corresponding partial region of each content plate 310. The composition block 610 generates moving image information with moving image information of each object generated by the object control block 606 combined with image information indicative of a content plate generated by the content plate generation block 604 and transmits the combined moving image information to the terminal 120. It should be noted that, in the above description, the server 110 side executes the processing of drawing avatars 301; however, it is also practicable to provide a configuration in which the terminal 120 side downloads the above-mentioned model data, motion data, and texture data to execute drawing processing on the terminal 120 side.

Consequently, two or more avatars 301 in a costume corresponding to each content are displayed on a corresponding content plate 310, in the partial region and with an action corresponding to the life activity of the user corresponding to each avatar 301, for example. In other words, as shown in FIG. 6 and FIG. 7, each avatar 301 is displayed, on a corresponding content plate, in a costume corresponding to the content concerned on a corresponding content plate, with an action indicative of doing work, moving on a train, or taking a meal, for example, and then displayed in a partial region corresponding to each of these actions. To be more specific, as seen from FIG. 7, each object being working is displayed in mainly the left-side partial region of the content plate 310 with an action corresponding to the life activity of the corresponding user, and so on. Further, partial regions may overlap with each other or the sizes thereof may differ from each other. For example, a configuration may be provided in which, for an object moving by bicycle, a partial region as an action range is set wide and this object is movable to a region in which work is going on.

It should be noted that the configuration of the server 110 described above is not limited to that mentioned above; that is, various variations may be made thereto. For example, a configuration may be provided in which, if, with respect to activity information including the same user ID, the content ID of the extracted activity information differs from the content ID of the activity information extracted last, namely, if the activity information is indicative of the movement to different content plates 310, then the motion data acquisition block 803 acquires predetermined motion data indicative of the movement of the avatar 301 moving between content plates and, at the same time, acquires motion data corresponding to the activity ID mentioned above. Here, the above-mentioned motion data is motion data indicative that the currently corresponding avatar 301 moves to an upper position of the screen of the arranged content plate 310 and then moves from the upper position of the arranged content plate 310 to the arrangement place. Also, in this case, a configuration may be provided in which, for another user to be able to visually recognize where the avatar moves next, the before the movement is replaced by the costume corresponding to the content plate 310 of the destination of movement. It should be noted that a configuration may be provided in which the motion data about the movement between the above-mentioned content plates 310 is stored as described above in the motion data storage block as related with the activity ID for identifying the movement between the content plates 310 and, when content IDs change, the above-mentioned motion data is acquired to display an action about the above-mentioned movement. Further, a configuration may be provided in which a compression block (not shown) for compressing the moving image information generated by the composition block 610 is arranged to transmit the compressed moving image information to the terminal 120.

Figure 13:
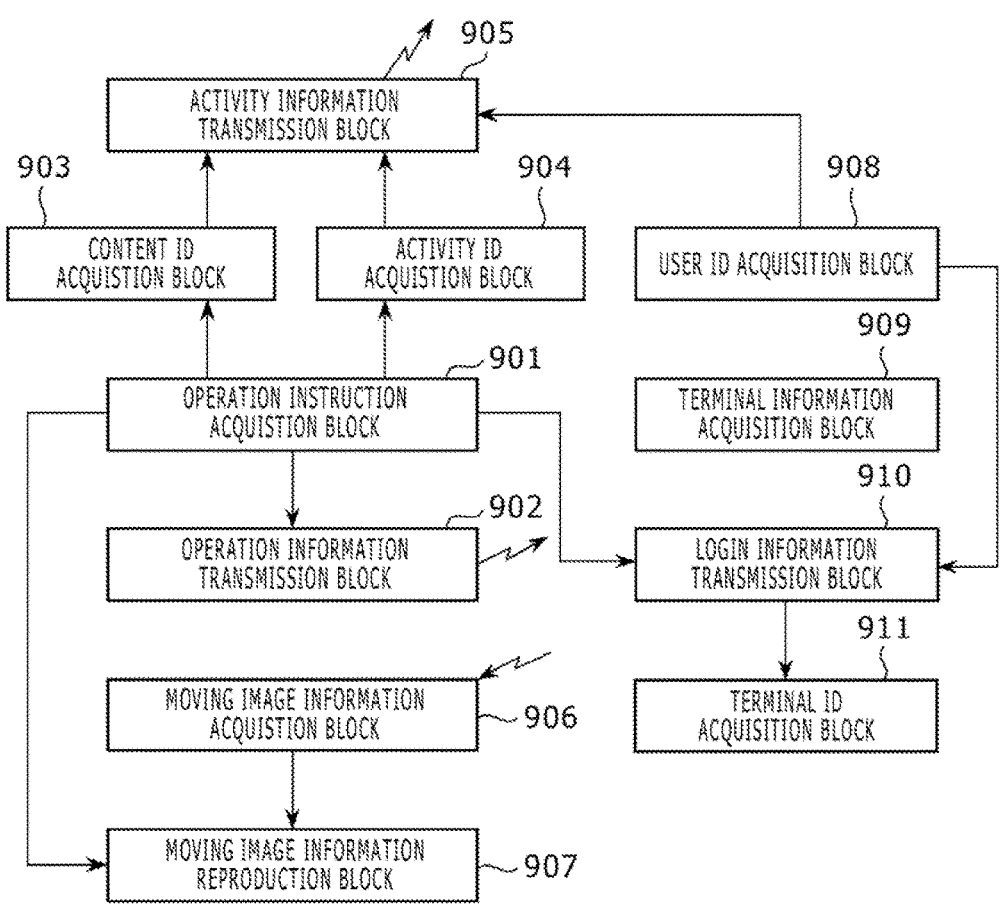
FIG. 13 is a diagram for describing one example of a functional configuration of an information terminal apparatus in the second embodiment.
Figure 14:
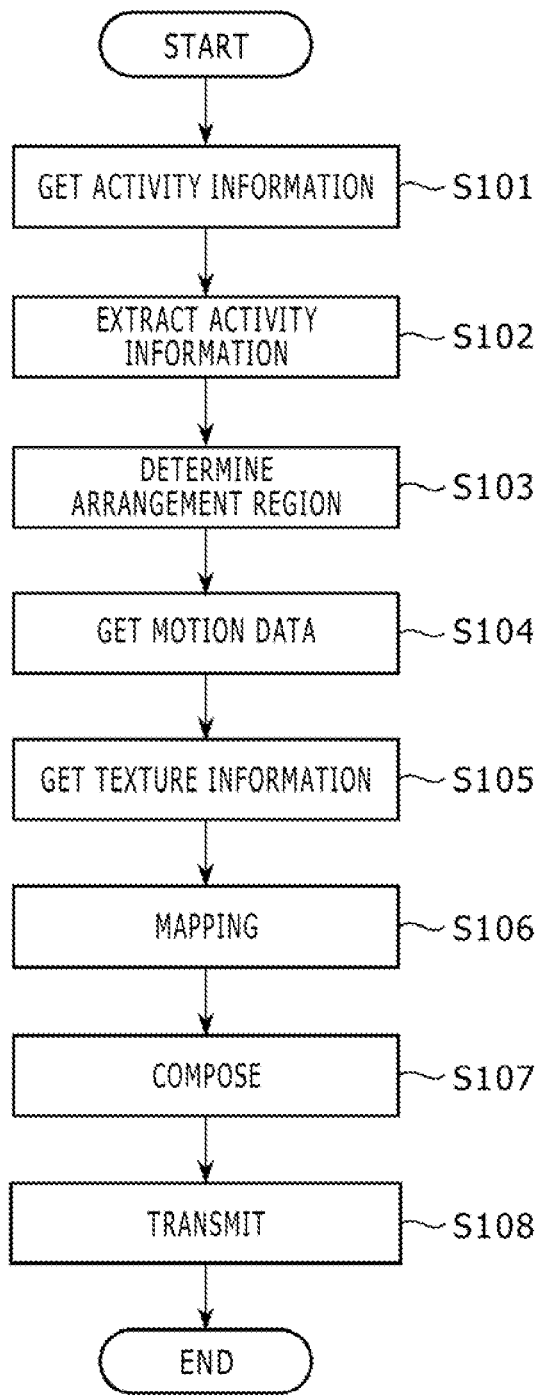
FIG. 14 is a diagram illustrating one example of a flow for controlling avatar actions in the second embodiment.

The following describes one example of a functional configuration of the terminal 120 of the information processing system 100 in the present embodiment with reference to FIG. 13. As shown in FIG. 13, the terminal 120 includes an operation instruction acquisition block 901, an operation information transmission block 902, a content ID acquisition block 903, an activity ID acquisition block 904, an activity information transmission block 905, a moving image information acquisition block 906, a moving image information reproduction block 907, a user ID acquisition block 908, a terminal information acquisition block 909, a login information transmission block 910, and a terminal ID acquisition block 911. It should be noted that the following mainly describes different points from the first embodiment described before and skips the similar points.

The operation instruction acquisition block 901 acquires operation instructions entered through the operation block 125 of the terminal 120. Operation instructions includes an operation instruction for moving the viewpoint in the virtual space 300, an operation instruction for selecting content, and an operation instruction for entering a life activity, for example. The operation information transmission block 902 transmits operation instructions to the server 110 as operation information.

The content ID acquisition block 903 acquires content identification information (a content ID). For example, if a predetermined movie is being reproduced, the content ID of this movie is acquired. Further, this content ID may be acquired on the basis of an operation instruction transmitted to the operation block 125.

The activity ID acquisition block 904 acquires an activity ID for identifying a life activity of a user indicative that the user is walking, running, moving by train, or taking a meal. A configuration may be provided in which the activity ID acquisition block 904 has an acceleration sensor for example and this life activity is acquired on the basis of an output of this acceleration sensor. Also, a configuration may be provided in which the activity ID is acquired by entering an activity being executed by the user as an operation instruction.

The user ID acquisition block 908 acquires identification information (a user ID) for identifying a user. To be more specific, a user ID entered by a user through the operation block 125 is acquired for example. It should be noted that a configuration may be provided in which this user ID is acquired by another method such as passing a predetermined card over.

The activity information transmission block 905 transmits activity information that includes the acquired content ID, activity ID, and user ID to the server 110. To be more specific, the activity information transmission block 905 transmits a user ID using this terminal 120, a content ID acquired by the content ID acquisition block 903, and an activity ID acquired by the life activity information acquisition block 601 to the server 110 as activity information, for example.

The moving image information acquisition block 906 acquires moving image information generated by the server 110 in accordance with the transmitted activity information.

Then, the moving image information reproduction block 907 displays this acquired moving image information onto the display block 124. It should be noted that the details of this moving image information is as described above.

It should be noted that the functional configuration of the terminal 120 is not limited to that described above; namely, various variations may be made thereto. For example, if moving image information concerned is compressed moving image information, a decompression block for decompressing the compressed moving image information may be arranged. In this case, obviously, the compressed moving image information is first decompressed and the decompressed moving image information is reproduced.

The following describes one example of flow for controlling actions of the avatar 301 at the server 110 in the present embodiment. It should be noted that the flow to be described below is illustrative only and therefore not limited thereto.

The activity information acquisition block 601 sequentially acquires activity information from each terminal 120. To be more specific, activity information including a user ID, a content ID, and an activity ID from the terminal 120, for example (S101). The activity information extraction block 801 extracts the activity information corresponding to the avatar 301 to be displayed on each content plate 310 on the basis of a predetermined criteria (S102).

The arrangement region determination block 802 determines a corresponding content plate 310 and an arrangement region in this corresponding content plate 310, of the avatar 301 corresponding to each user ID on the basis of the extracted activity information (S103). The motion data acquisition block 803 acquires motion data corresponding to the activity ID from the motion data storage block 608 for example on the basis of the activity ID of the extracted activity information (S104).

The texture information acquisition block 804 acquires texture information to be mapped to the avatar 301 from the texture information acquisition block 804 on the basis of the content ID of the extracted activity information (S105). The mapping block 805 maps an acquired object to the avatar 301 (S106).

The moving image information generation block 806 generates moving image information for making the avatar 301 mapped with a texture in a partial region of the corresponding content plate 310 in accordance with the acquired motion data (S107). The composition block 610 generates moving image information combined with the moving image information of each avatar 301 generated by the object control block 606 in the content plate image information generated by the content plate generation block 604 and transmits the combined moving image information to the corresponding terminal 120 (S108) and ends processing. It should be noted that the above-mentioned moving image information is reproduced on the corresponding terminal 120 and the moving image as described with reference to FIG. 6 mentioned above for example is displayed on the display block 124 of the terminal 120.

Figure 15:
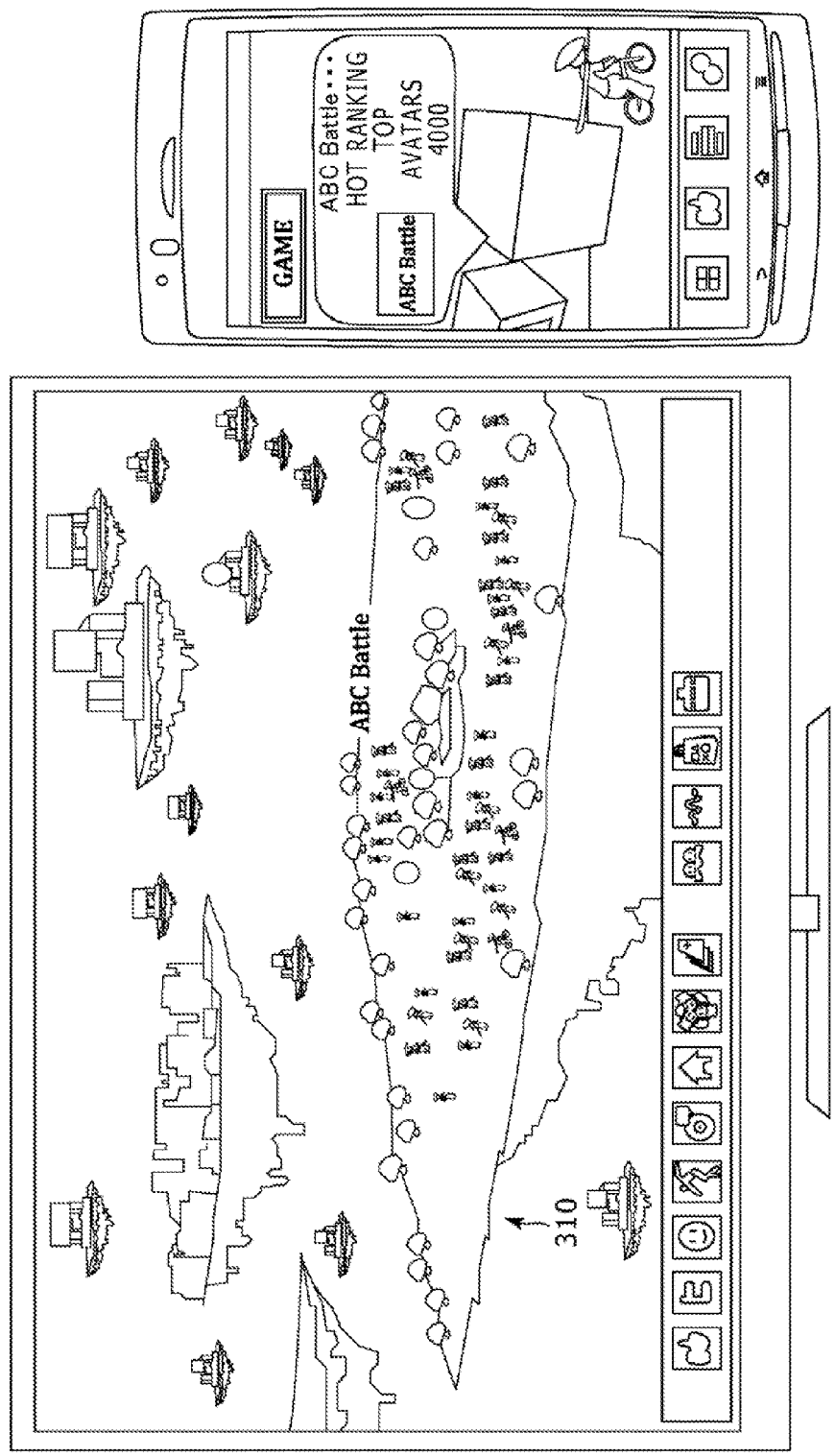
FIG. 15 is a diagram illustrating one example of delivery information in the second embodiment.

The following describes a specific example that is actually delivered to the terminal 120 to be displayed on the terminal 120 in the present embodiment. For example, as shown in FIG. 15, image information including the above-mentioned content plate 310 is displayed on the display block 124 of one terminal 120 (main terminal) and information about the content plate 310 mainly displayed on the main terminal 120 is displayed on the other terminal 120 (sub terminal). Here, the information about the content plate 310 concerned includes a name of a category to which the content plate 310 concerned belongs, a name of a game equivalent to the content plate 310 concerned, a ranking in the community of the game concerned, and a number of avatars belonging to the content plate 310, for example. It should be noted that, in FIG. 15, an example is shown in which the main terminal 120 is a game device and the display block 124 is a liquid crystal television.

Figure 16:
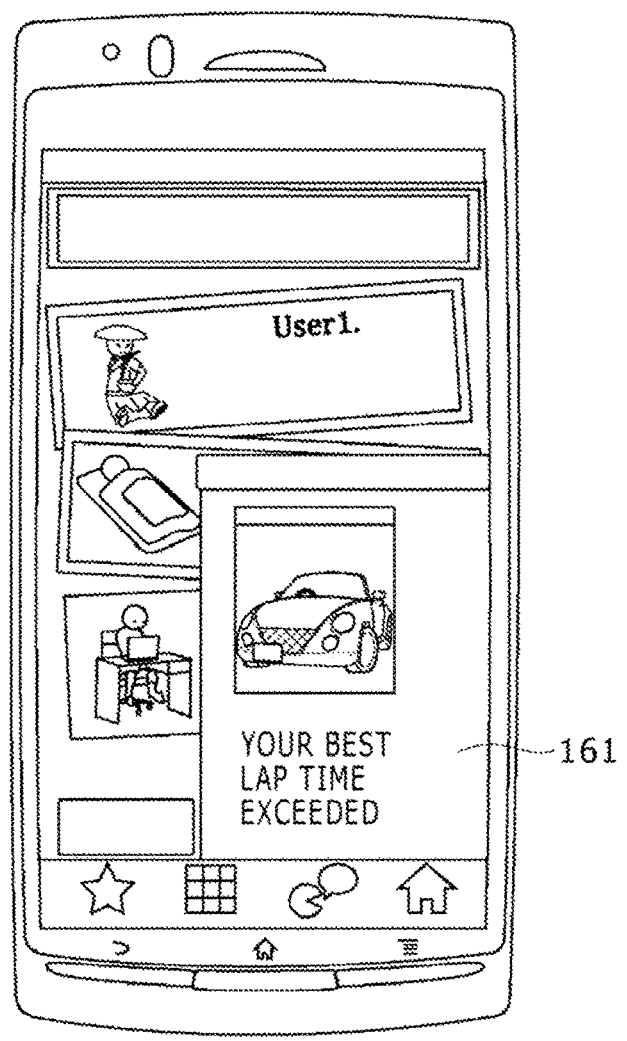
FIG. 16 is a diagram illustrating another example of delivery information in the second embodiment.
Figure 17:
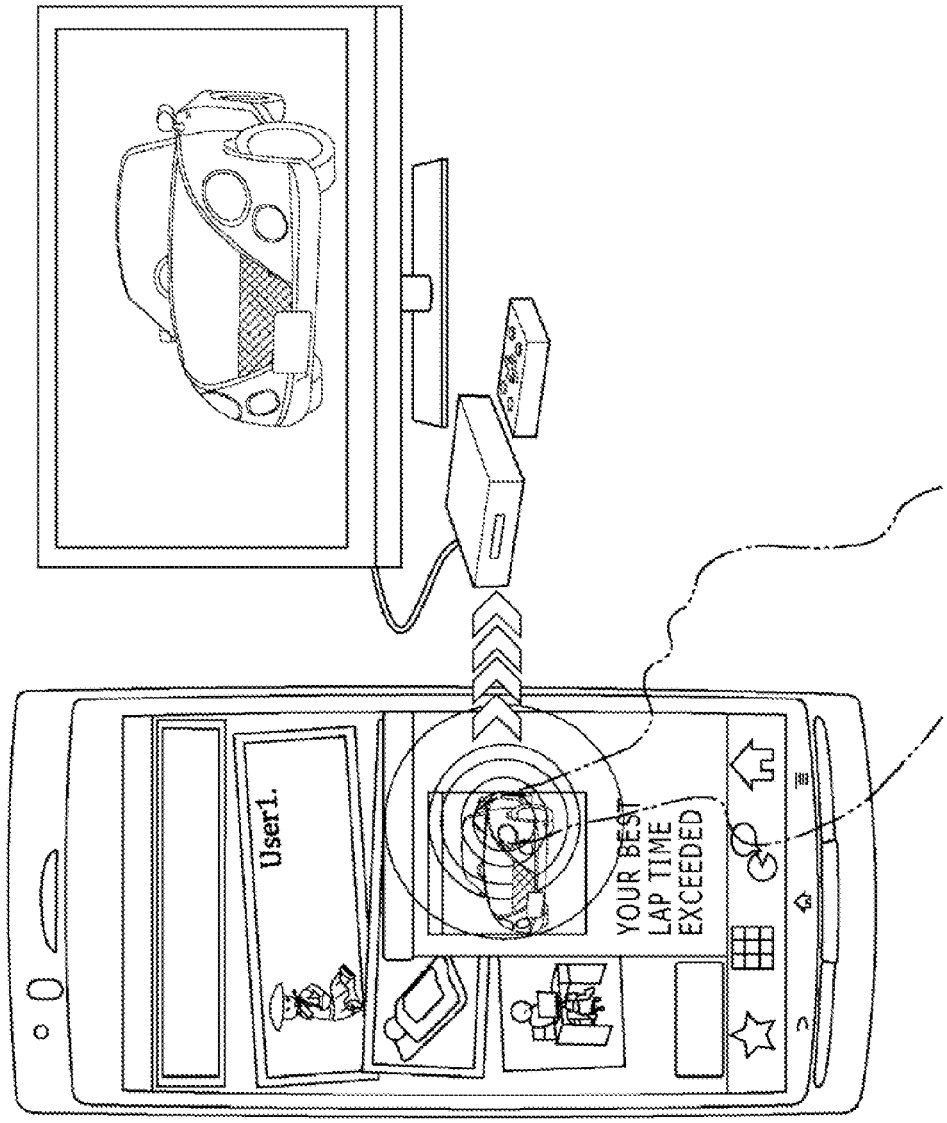
FIG. 17 is a diagram illustrating still example of delivery information in the second embodiment.

Referring to FIG. 16, there is shown another example of a display screen that is displayed on the terminal 120 (sub terminal). As shown in FIG. 16, information to be delivered to the sub terminal 120 concerned for example is information about a user registered as a friend in a community service concerned and, if another user registered as a friend exceeds in the results of a game of the user of the sub terminal 120 concerned, then an image indicative thereof is displayed in a manner of popup display 161. It should be noted that a configuration may be provided in which, for this popup display 161, the user selects on/off of this popup display 161 in advance. In addition, as shown in FIG. 17, if the terminal 120 concerned has a touch panel, a configuration may be provided in which the user touches a part of image information concerned, thereby starting a game concerned at another terminal 120 on which the user is logging in. As shown in FIG. 17, if information indicative that another user has exceeded in the results of a racing game for example is displayed in a manner of popup display, then the user using the sub terminal 120 concerned touches a predetermined part of the popup display 161 concerned, thereby starting the corresponding racing game on the main terminal 120 (a game device for example) to generate a display screen thereof on the display block 124 (a TV device for example).

Figure 18:
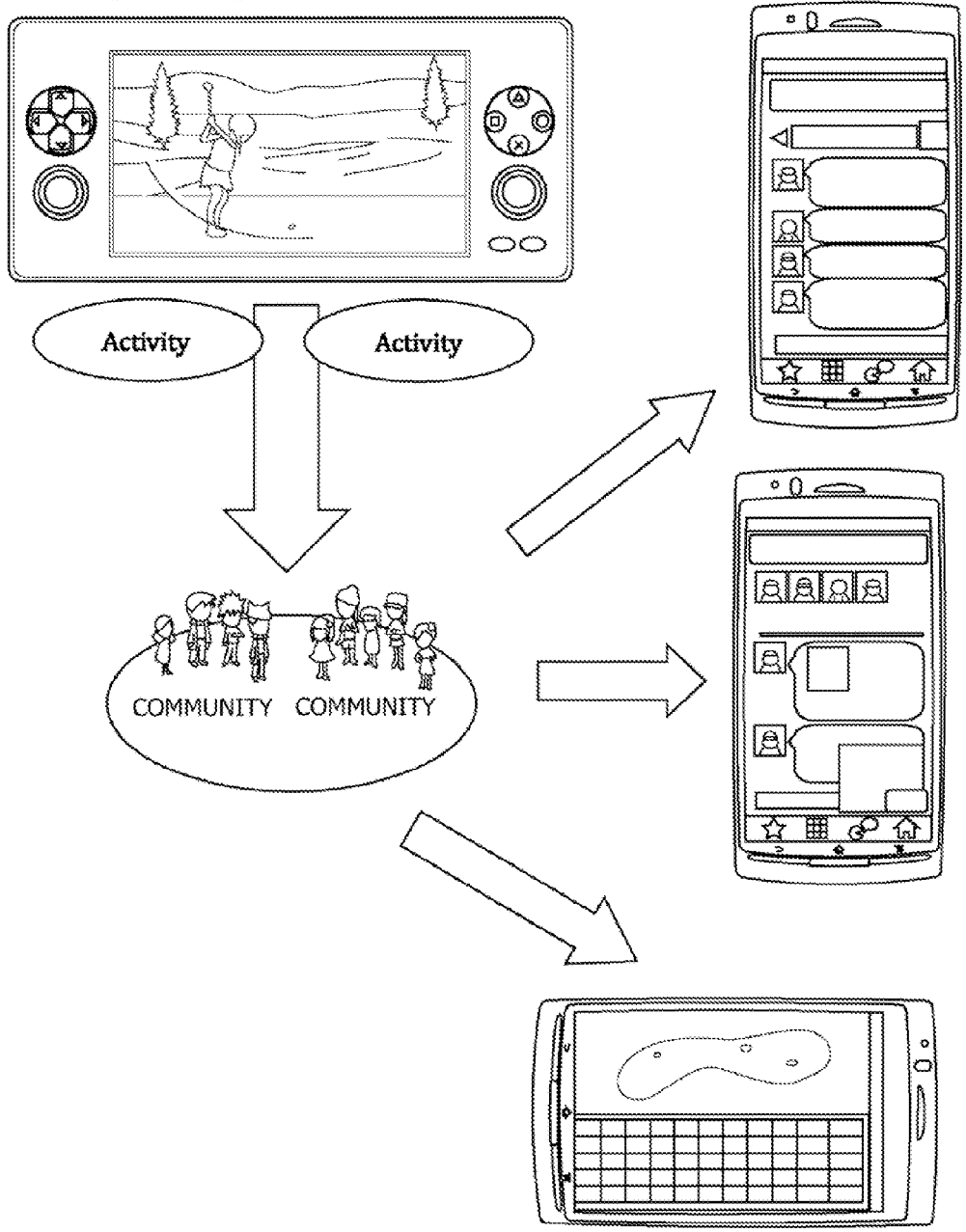
FIG. 18 is a diagram illustrating yet example of delivery information in the second embodiment.

Referring to FIG. 18, there is shown a diagram for describing screen variations that are displayed on a sub terminal. FIG. 18 shows an example in which the user is logging in on the above-mentioned community service on the main terminal 120 and the sub terminal 120 and the user is playing a game on the main terminal 120 (a portable game device for example). Namely, in this case, the activity information of the user is transmitted from the main terminal 120 to the server 110 that forms the community. The community service concerned is realized on the above-mentioned server 110 for example as described before. Then, a virtual space corresponding to the activity information concerned is displayed on the terminal 120.

In this case, as shown at the upper right in FIG. 18, a configuration may be provided in which a bulletin board about the game concerned or an image for realizing a chat function is displayed on the sub terminal 120 (a portable terminal 120 for example). To be more specific, in accordance with the progress of this game, this image includes a comment or a message of another user of almost equal level or almost equal progress in the game concerned, for example. It should be noted that the number of sub terminals 120 may be two or more; in this case, a configuration may be provided in which two or more images are displayed on each sub terminal 120. These two or more images may be the same or overlap partially or totally.

Also, as shown at the right-center in FIG. 18, a configuration may be provided in which, if, with respect to a game, a mission (winning five trophies in the game for example) common to the users through a community concerned is created, the contents of this common mission or the messages of these users are displayed the screen of the sub terminal 120 (a portable terminal for example). Further, a configuration may be provided in which, if this common mission has been achieved, a victory ceremony or a review meeting, or like events are generated in the community concerned.

Still further, a configuration may be provided in which the server 110 understands user situations such as a game progress state for example and image information for properly guiding the user is delivered. To be more specific, as shown at the lower right in FIG. 18, a configuration may be provided in which an operation screen in accordance with the progress state of the game concerned or a screen on which the map, help, and hint associated with the game are displayed. In this case, if there is no map information indicative of maps on the terminal 120, a configuration may be provided in which maps are downloaded from the server 110 for example to be acquired. Also, a configuration may be provided in which activity information includes user positional information and positions on the map included in this positional information is indicated. In addition, a configuration may be provided in which a game item selection screen is displayed. In this case, the user selects an item on the item selection screen of the terminal 120 concerned so as to reflect the selection onto the contents of the game on the game screen displayed on the main terminal 120, for example. Also, a configuration may be provided in which the above-mentioned guide information is provided by another user. In this case, a configuration may be provided in which this guide information is displayed in accordance with the above-mentioned activity.

The present invention is not limited the first and second embodiments so far described; namely, the configurations of the first and second embodiments of the present invention may be replaced by configurations that are substantially the same as those of the above-mentioned embodiments, bring about substantially the same effects as those of the above-mentioned embodiments, or achieve substantially the same objects as those of the above-mentioned embodiments. For example, with respect to a login function, a configuration may be provided in which, if one terminal 120 already logged in and another terminal 120 not yet logged in are at a predetermined distance from each other, then automatic login is executed. Also, a configuration may be provided in which a predetermined two-dimensional barcode is displayed or a predetermined sound or signal is outputted on or from one terminal 120 and login is executed through another logged in terminal 120, for example. To be more specific, a configuration may be provided in which login is executed by outputting a predetermined sound signal from one terminal 120 and recording this sound signal on another logged in terminal 120 to take pairing or by displaying a predetermined image on one terminal 120 and taking this predetermined image with a camera included in the logged in terminal 120 to take pairing of the taken-image with an already stored image. Further, a configuration may be provided in which the login information acquisition block 131 acquires login information of another terminal 120 through one terminal 120.

In addition, a configuration may be provided in which one terminal 120 has a notebook function, information corresponding to the activity information of the user of this terminal 120 is recorded along with the date and time in this notebook, and another user can browse this information or write comments to this notebook. Also, a configuration may be provided in which, with respect to a community that is realized in the information processing system 100 described before, users are grouped separate from content such as a game program and this group creates a goal and, when the goal has been achieved, points or the like in this community are won, for example. The goal mentioned above may be a goal associated with activity information for example.

Further, a profile screen may be generated for each user and a log associated with the content such as a log of a game played by each game user may be displayed on this profile screen, for example. In this case, a configuration may be provided in which a color of a category plate and a color used for displaying a log concerned are matched each other, thereby facilitating the recognition of the log of another user by color. It should be noted that the information processing apparatus and the information terminal apparatus cited in the scope of claims hereof correspond to the above-mentioned server 110 and the terminal 120, respectively, for example. In addition, the functional configuration in the above-mentioned second embodiment may be used independently of the functional configuration indicated by the first embodiment.

The invention claimed is:

1. An information processing system in an information processing apparatus for arranging an object corresponding to each of a plurality of users in a virtual space and generating moving image information indicative of a moving image indicative of a manner in which said virtual space is viewed from a predetermined viewpoint arranged in said virtual space, said information processing system comprising:
   an activity information acquisition unit configured to sequentially acquire activity information indicative of an action of at least one of said plurality of users;
   an arrangement region determination unit configured to determine a partial region in said virtual space, in the partial region of which said object is arranged in accordance with said acquired activity information, where said virtual space includes a plurality of content plates indicative of regions having shapes different from content to content used by a user and said partial region is a partial region in one of said plurality of content plates;
   a motion data acquisition unit configured to acquire motion data stored as related with said activity information in accordance with said acquired activity information; and
   an object control unit configured to make said object act in said partial region in accordance with said acquired motion data,
   wherein said activity information includes user identification information for identifying a user, content identification information related with each of said content plates, and activity identification information indicative of a user action, and
   wherein said motion data is related with said activity information and said activity identification information.

2. The information processing system according to claim 1, further comprising:
   a count unit configured to count the number of acquired pieces of user identification information for each of pieces of content identification information acquired within a predetermined period of time; and
   an area change unit configured to change an area of each of said content plates,
   wherein in accordance with the number of pieces of user identification information counted for each of said pieces of content identification information, said area change unit changes an area of each of said content plates.

3. The information processing system according to claim 1, wherein if said activity information acquisition unit acquires activity information including content identification information different from last content identification information, then, in accordance with different content identification information, said object control unit moves said object to a content plate different from a content plate on which said object is currently arranged.

4. The information processing system according to claim 1, further comprising: a texture information acquisition unit configured to acquire, in accordance with said acquired content identification information, each piece of texture information to be mapped to said object as a texture, said each piece of texture information being stored for each piece of said content identification information; wherein, on the basis of said acquired texture information, mapping to said object is executed.

5. The information processing system according to claim 1, further comprising:
   an activity information extraction unit configured to extract one or more pieces of activity information from a plurality of pieces of activity information from each of said plurality of users, said one or more pieces of activity information corresponding to an object arranged in said virtual space,
   wherein said arrangement region determination unit determines said partial region in accordance with said extracted activity information and said object control unit acquires said motion data in accordance with said extracted activity information.

6. The information processing system according to claim 5, wherein said activity information extraction unit extracts said one or more pieces of activity information in a random manner.

7. A processing system for arranging an object corresponding to each of a plurality of users in a virtual space and generating moving image information indicative of a moving image indicative of a manner in which said virtual space is viewed from a predetermined viewpoint in said virtual space, the processing system including a microprocessor operating under the control of a computer program, causing the processing system to function as:
   an activity information acquisition unit configured to sequentially acquire activity information indicative of an action of at least one of said plurality of users;
   an arrangement region determination unit configured to determine a partial region in said virtual space, in the partial region of which said object is arranged in accordance with said acquired activity information, where said virtual space includes a plurality of content plates indicative of regions having shapes different from content to content used by a user and said partial region is a partial region in one of said plurality of content plates;
   a motion data acquisition unit configured to acquire motion data stored as related with said activity information in accordance with said acquired activity information; and
   an object control unit configured to make said object act in said partial region in accordance with said acquired motion data,
   wherein said activity information includes user identification information for identifying a user, content identification information related with each of said content plates, and activity identification information indicative of a user action, and
   wherein said motion data is related with said activity information and said activity identification information.

8. A non-transitory, computer-readable recording medium storing a program, comprising:
   an activity information acquisition unit configured to sequentially acquire activity information indicative of an action of at least one of said plurality of users;
   an arrangement region determination unit configured to determine a partial region in said virtual space, in the partial region of which said object is arranged in accordance with said acquired activity information, where said virtual space includes a plurality of content plates indicative of regions having shapes different from content to content used by a user and said partial region is a partial region in one of said plurality of content plates;
   a motion data acquisition unit configured to acquire motion data stored as related with said activity information in accordance with said acquired activity information; and
   an object control unit configured to make said object act in said partial region in accordance with said acquired motion data,
   wherein said activity information includes user identification information for identifying a user, content identification information related with each of said content plates, and activity identification information indicative of a user action, and
   wherein said motion data is related with said activity information and said activity identification information.

9. An information processing method for arranging an object corresponding to each of a plurality of users in a virtual space and generating moving image information indicative of a moving image indicative of a manner in which said virtual space is viewed from a predetermined viewpoint arranged in said virtual space, said information processing method comprising:
   sequentially acquiring activity information indicative of an action of at least one of said plurality of users;
   determining a partial region in said virtual space, in the partial region of which said object is arranged in accordance with said acquired activity information, where said virtual space includes a plurality of content plates indicative of regions having shapes different from content to content used by a user and said partial region is a partial region in one of said plurality of content plates;
   acquiring motion data stored as related with said activity information in accordance with said acquired activity information; and
   making said object act in said partial region in accordance with said acquired motion data,
   wherein said activity information includes user identification information for identifying a user, content identification information related with each of said content plates, and activity identification information indicative of a user action, and
   wherein said motion data is related with said activity information and said activity identification information.

10. An information terminal apparatus for arranging an object corresponding to each of a plurality of users in a virtual space and acquiring moving image information indicative of a manner in which said virtual space is viewed from a predetermined viewpoint arranged in said virtual space, said information terminal apparatus comprising:

a content identification information acquisition unit configured to acquire content identification information for identifying content;

an activity identification information acquisition unit configured to acquire activity identification information for identifying an action of a user;

a user identification information acquisition unit configured to identify a user;

an activity information transmission unit configured to sequentially transmitting activity information including said user identification information, said content identification information, and said user identification information to an information processing apparatus;

a moving image information acquisition unit configured to acquire said moving image information; and a display unit configured to display said acquired moving image, wherein said moving image information is moving image information that made said object act with motion data acquired in accordance with said activity identification information, in a partial region in said virtual space corresponding to said content identification information, said virtual space includes a plurality of content plates indicative of regions having shapes different from content to content used by a user and said partial region is a partial region in one of said plurality of content plates, said activity information includes user identification information for identifying a user, content identification information related with each of said content plates, and activity identification information indicative of a user action, and said motion data is related with said activity information and said activity identification information.

* * * * *